United States Patent
Ma et al.

(10) Patent No.: US 11,324,010 B2
(45) Date of Patent: May 3, 2022

(54) METHOD AND APPARATUS FOR COMMUNICATING DOWNLINK CONTROL INFORMATION IN A TERMINAL DEVICE-SPECIFIC SEARCH SPACE OR IN A COMMON SEARCH SPACE

(71) Applicant: HUAWEI TECHNOLOGIES CO.,LTD., Guangdong (CN)

(72) Inventors: Ruixiang Ma, Beijing (CN); Yongxia Lyu, Ottawa (CA); Jiafeng Shao, Beijing (CN); Xinghua Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 16/876,103

(22) Filed: May 17, 2020

(65) Prior Publication Data

US 2020/0280995 A1    Sep. 3, 2020

Related U.S. Application Data

(63) Continuation of application No. PCT/CN2018/114995, filed on Nov. 12, 2018.

(30) Foreign Application Priority Data

Nov. 17, 2017  (CN) .......................... 201711149124.6

(51) Int. Cl.
*H04W 72/04* (2009.01)
*H04W 76/27* (2018.01)
*H04L 5/00* (2006.01)

(52) U.S. Cl.
CPC ....... *H04W 72/0493* (2013.01); *H04L 5/0092* (2013.01); *H04W 72/042* (2013.01); *H04W 72/0453* (2013.01); *H04W 76/27* (2018.02)

(58) Field of Classification Search
CPC ............. H04W 72/0493; H04W 76/27; H04W 72/042; H04W 72/0453; H04W 72/1289; H04L 5/0092
See application file for complete search history.

(56) References Cited

U.S. PATENT DOCUMENTS

| 9,420,576 B2 | 8/2016 | Chen et al. |
| 2010/0157922 A1 | 6/2010 | Kim et al. |

(Continued)

FOREIGN PATENT DOCUMENTS

| CN | 101764642 A | 6/2010 |
| CN | 101867953 A | 10/2010 |

(Continued)

OTHER PUBLICATIONS

3GPP TS 38.212 V1.0.0 (Sep. 2017),3rd Generation Partnership Project;Technical Specification Group Radio Access Network;NR;Multiplexing and channel coding(Release 15), total 28 pages.

(Continued)

*Primary Examiner* — Jael M Ulysse
(74) *Attorney, Agent, or Firm* — Leydig, Voit & Mayer, Ltd.

(57) ABSTRACT

Embodiments in this application relate to method and apparatus for transmitting downlink control information. A network device determines downlink control information, where the downlink control information includes at least one information field. The network device sends the downlink control information to a terminal device in a common search space or a common control resource set, or sends the downlink control information to the terminal device in a specific search space or a specific control resource set. The terminal device receives the downlink control information, and determines information indicated by the at least one information field of the downlink control information.

(Continued)

According to the solutions provided in the embodiments of this application, requirements of various communication scenarios can be better satisfied.

28 Claims, 3 Drawing Sheets

(56) References Cited

U.S. PATENT DOCUMENTS

| | | | |
|---|---|---|---|
| 2013/0039284 A1* | 2/2013 | Marinier | H04L 5/001 370/329 |
| 2013/0077582 A1* | 3/2013 | Kim | H04W 74/006 370/329 |
| 2013/0265944 A1* | 10/2013 | Frenne | H04L 1/0031 370/329 |
| 2013/0343313 A1* | 12/2013 | Takeda | H04L 27/2602 370/329 |
| 2014/0341126 A1* | 11/2014 | Piipponen | H04L 5/003 370/329 |
| 2015/0124724 A1* | 5/2015 | Yang | H04W 72/042 370/329 |
| 2015/0181608 A1* | 6/2015 | Frederiksen | H04L 5/0092 455/450 |
| 2018/0049203 A1* | 2/2018 | Xue | H04L 5/0053 |
| 2018/0098361 A1* | 4/2018 | Ji | H04L 5/0092 |
| 2018/0176753 A1* | 6/2018 | Kim | H04L 5/0094 |
| 2018/0183551 A1* | 6/2018 | Chou | H04L 5/0098 |
| 2018/0220305 A1* | 8/2018 | Lei | H04W 72/005 |
| 2018/0367386 A1* | 12/2018 | Liao | H04L 5/0053 |
| 2019/0082431 A1* | 3/2019 | Yi | H04L 5/0055 |
| 2019/0132793 A1* | 5/2019 | Lin | H04W 52/0225 |
| 2019/0260530 A1* | 8/2019 | Yi | H04W 72/0453 |
| 2020/0045658 A1* | 2/2020 | Nam | H04L 5/0053 |
| 2020/0059345 A1* | 2/2020 | Pelletier | H04L 1/1657 |
| 2020/0077368 A1* | 3/2020 | Tang | H04W 72/04 |
| 2020/0120642 A1* | 4/2020 | Hwang | H04L 5/0094 |
| 2020/0120680 A1* | 4/2020 | Hwang | H04L 5/0044 |
| 2020/0163085 A1* | 5/2020 | Takeda | H04L 5/0044 |
| 2020/0213065 A1* | 7/2020 | Takeda | H04L 5/0082 |

FOREIGN PATENT DOCUMENTS

| | | |
|---|---|---|
| CN | 101998509 A | 3/2011 |
| CN | 103812602 A | 5/2014 |
| CN | 104244417 A | 12/2014 |
| CN | 104871448 A | 8/2015 |
| CN | 105472757 A | 4/2016 |
| EP | 2458908 A1 | 5/2012 |
| EP | 2946521 A1 | 11/2015 |
| JP | 2015180094 A | 10/2015 |
| RU | 2472316 C1 | 1/2013 |
| RU | 2583376 C2 | 5/2016 |
| WO | 2014112937 A1 | 7/2014 |
| WO | 2016053450 A1 | 4/2016 |
| WO | 2017133212 A1 | 8/2017 |
| WO | 2017157466 A1 | 9/2017 |

OTHER PUBLICATIONS

3GPP TS 38.213 V1.0.0 (Sep. 2017),3rd Generation Partnership Project;Technical Specification Group Radio Access Network;NR;Physical layer procedures for control(Release 15), total 16 pages.

3GPP TS 38.214 V1.0.0 (Sep. 2017),3rd Generation Partnership Project;Technical Specification Group Radio Access Network;NR;Physical layer procedures for data (Release 15), total 32 pages.

3GPP TS 38.331 V0.1.0 (Oct. 2017),3rd Generation Partnership Project;Technical Specification Group Radio Access Network;NR-;Radio Resource Control (RRC);Protocol specification(Release 15), total 42 pages.

Campos "Understanding the 5G NR Physical Layer," pp. 1-111, Keysight Technologies (Nov. 1, 2017).

CN/201711149124.6, Notice of Allowance/Search Report, dated Sep. 30, 2021.

* cited by examiner

METHOD AND APPARATUS FOR COMMUNICATING DOWNLINK CONTROL INFORMATION IN A TERMINAL DEVICE-SPECIFIC SEARCH SPACE OR IN A COMMON SEARCH SPACE

CROSS-REFERENCE TO RELATED APPLICATIONS

This application is a continuation of International Patent Application No. PCT/CN2018/114995, filed on Nov. 12, 2018, which claims priority to Chinese Patent Application No. 201711149124.6, filed on Nov. 17, 2017. The disclosures of the aforementioned applications are hereby incorporated by reference in their entireties.

TECHNICAL FIELD

This application relates to the communication field, and in particular, to a method for determining downlink control information and a communication apparatus.

BACKGROUND

In certain communication systems, before sending uplink data or receiving downlink data, a terminal device needs to obtain scheduling information, such as time-frequency resource allocation or a modulation and coding scheme, configured by a network device for the terminal device. In addition, the network device also needs to notify the terminal device of information such as a power control command related to uplink transmission. Therefore, the network device sends downlink control information (DCI) to the terminal device, the DCI carries one or more information fields, and each information field indicates information such as scheduling information and a power control command to the terminal device. It may be considered that the DCI is used for scheduling data transmission.

In the communication systems, a downlink control channel is commonly used to carry the DCI (for example, a physical downlink control channel (PDCCH)). Certainly, the DCI may be alternatively carried by using another channel. The terminal device first needs to perform blind detection in a control resource set or a search space in a control area. The search space may be considered as a set of downlink control channels that are monitored by the terminal device. The search space includes a common search space and a user equipment (UE)-specific search space (or referred to as a terminal device-specific search space, a specific search space for short). The common search space is a search space that is monitored by a plurality of terminal devices, and the specific search space is a search space that is monitored by a specific terminal device in a cell. For DCI payloads having a same quantity of bits (same payload size), even if formats of the DCI payloads are different, the terminal device only needs to perform blind detection once in a search space, and then determines a specific format of a DCI payload after receiving the DCI. However, for DCI payloads having different quantities of bits, the terminal device needs to perform blind detection once for each quantity of bits. The more times of blind detections, the longer duration it takes for the terminal device to perform the blind detection, and therefore a longer data transmission latency and higher power consumption of the terminal device are resulted. In addition, a larger quantity of bits of the DCI means higher overheads of system resources occupied by the DCI, resulting in lower data transmission efficiency.

To cope with explosive growth of mobile data traffic, massive mobile communication device connections, and various services and scenarios springing up now and in the future, the fifth generation (5G) mobile communication systems emerge. However, different services and scenarios may also have different requirements on the mobile communication systems. For example, an ultra-reliable and low latency communication (URLLC) scenario has very stringent reliability and latency requirements on data transmission. For example, an uplink or downlink user plane latency cannot exceed 0.5 millisecond, and a bit error rate within 1 millisecond cannot exceed 0.0001%. Therefore, how to design DCI that can better satisfy service-specific requirements and scenario-specific requirements is a problem that needs to be resolved urgently.

SUMMARY

Embodiments of this application provide a plurality of methods for determining downlink control information and apparatuses, to better satisfy a service requirement and a scenario requirement.

According to a first aspect, an embodiment of this application provides a method for determining downlink control information by a terminal device. The method includes:

receiving downlink control information in a common search space or a common control resource set; or receiving the downlink control information in a specific search space or a specific control resource set of the terminal device, where the downlink control information includes at least one information field; and determining information indicated by the at least one information field.

In a possible design, the at least one information field includes a first information field, the first information field indicates a format of the downlink control information, the format of the downlink control information is one of a plurality of formats, and the plurality of formats correspond to a same quantity of bits.

In the foregoing manner, downlink control information in the plurality of formats corresponds to a same quantity of bits, that is, quantities of bits of the downlink control information in the plurality of formats are the same. The terminal device may receive downlink control information in one of the formats by performing only one blind detection process, so that a latency in receiving the downlink control information by the terminal device is reduced, and electric energy is saved, thereby better satisfying a scenario or service requirement.

In a possible design, the first information field further indicates a transmission direction of data transmission scheduled by using the downlink control information.

In a possible design, when the downlink control information is received in the common search space or the common control resource set, or the format of the received downlink control information is a first format, the at least one information field does not carry information indicated by a second information field; and/or when the downlink control information is received in the specific search space or the specific control resource set of the terminal device, or the format of the received downlink control information is a second format, the at least one information field includes a second information field; and the method further includes: receiving higher layer signaling, where the higher layer signaling indicates that the downlink control information includes the second information field, and/or the higher layer signaling indicates a quantity of bits of the second information field; and the second information field indicates a carrier corresponding to the data transmission scheduled by using the downlink control information, or the second information field indicates whether a time-frequency resource that is not occupied in a pre-configured resource set can be occupied by the data transmission scheduled by using the downlink control information.

In a possible design, the at least one information field includes a third information field, and the third information field indicates a frequency domain resource location occupied by the data transmission scheduled by using the downlink control information; and when the downlink control information is received in the common search space or the common control resource set, or the format of the received downlink control information is the first format, the downlink control information is scrambled by using a first radio network temporary identifier, the frequency domain resource location indicated by the third information field is in a first bandwidth part, and a location of a reference physical resource block 0 of the frequency domain resource location indicated by the third information field is a physical resource block 0 in the first bandwidth part; or the downlink control information is scrambled by using a second radio network temporary identifier, the frequency domain resource location indicated by the third information field in the downlink control information is in a second bandwidth part, and a location of a reference physical resource block 0 of the frequency domain resource location indicated by the third information field is a physical resource block 0 in the second bandwidth part; and/or when the downlink control information is received in the specific search space or the specific control resource set of the terminal device, or the format of the received downlink control information is the second format, the frequency domain resource location correspondingly indicated by the third information field in the downlink control information is in a third bandwidth part, and a location of a reference physical resource block 0 of the frequency domain resource location indicated by the third information field is a physical resource block 0 in the third bandwidth part.

In a possible design, when the downlink control information is received in the common search space or the common control resource set, or the format of the received downlink control information is the first format, the at least one information field does not carry information indicated by a fourth information field, the downlink control information corresponds to preset time domain resource information, and the preset time domain resource information indicates a time domain resource location occupied by the data transmission scheduled by using the downlink control information; or the at least one information field includes the fourth information field, the fourth information field includes $\lceil \log_2 N \rceil$ bits, at least one state value of the $\lceil \log_2 N \rceil$ bits corresponds to a row in a first table, at least one row in the first table indicates at least one of a start symbol, a symbol length, and an end symbol, and N is a positive integer; and/or when the downlink control information is received in the specific search space or the specific control resource set of the terminal device, or the format of the received downlink control information is the second format, the at least one information field includes the fourth information field, the fourth information field includes $\lceil \log_2 M \rceil$ bits, at least one state value of the $\lceil \log_2 M \rceil$ bits corresponds to a row in a second table, at least one row in the second table indicates at least one of a start symbol, a symbol length, and an end symbol, and M is a positive integer; and the fourth information field indicates the time domain resource location occupied by the data transmission scheduled by using the downlink control information.

In a possible design, the first table consists of N rows in a third table, at least one row in the third table indicates at least one of a start symbol, a symbol length, and an end symbol, and the third table is stipulated in a protocol, or the third table is configured by using higher layer signaling; and/or the second table consists of M rows in a fourth table, at least one row in the fourth table indicates at least one of a start symbol, a symbol length, and an end symbol, and the fourth table is stipulated in a protocol, or the fourth table is configured by using higher layer signaling.

In a possible design, when the downlink control information is received in the common search space or the common control resource set, or the format of the received downlink control information is the first format, the at least one information field does not carry information indicated by a fifth information field, the downlink control information corresponds to a preset K value, and the preset K value indicates a time interval between a receiving time of data scheduled by using the downlink control information and a transmitting time of a hybrid automatic repeat request (HARQ) feedback corresponding to the data; or the at least one information field includes a fifth information field, the fifth information field includes $\lceil \log_2 P \rceil$ bits, at least one state value of the $\lceil \log_2 P \rceil$ bits corresponds to one of P K values, each of the P K values indicates a time interval between a receiving time of data scheduled by using the downlink control information and a transmitting time of a HARQ feedback corresponding to the data, and P is a positive integer; and/or when the downlink control information is received in the specific search space or the specific control resource set of the terminal device, or the format of the received downlink control information is the second format, the at least one information field includes a fifth information field; and the method further includes: receiving configuration information, where the configuration information indicates a set of K values, the set of K values includes Q K values, the fifth information field includes $\lceil \log_2 Q \rceil$ bits, at least one state value of the $\lceil \log_2 Q \rceil$ bits corresponds to one of the Q K values, each of the Q K values indicates a time interval between a receiving time of data scheduled by using the downlink control information and a transmitting time of a HARQ feedback corresponding to the data, and Q is a positive integer.

In a possible design, when the downlink control information is received in the common search space or the common control resource set, or the format of the received downlink control information is the first format, the at least one information field does not carry information indicated by a sixth information field; and/or when the downlink control information is received in the specific search space or the specific control resource set of the terminal device, or the format of the received downlink control information is the second format, the at least one information field includes a sixth information field, and the sixth information field is greater than or equal to one bit; and the sixth information field indicates whether the terminal device needs to report aperiodic channel quality information (or referred to as channel quality indicator (CQI)), and/or the sixth information field instructs the terminal device whether to perform sounding reference signal (SRS) measurement.

In a possible design, when the downlink control information is received in the common search space or the common control resource set, or the format of the received downlink control information is the first format, the at least one information field includes a seventh information field, the seventh information field is greater than or equal to one bit, a state value of the seventh information field corresponds to one of X redundancy versions, and X is a positive integer; and/or when the downlink control information is received in the specific search space or the specific control resource set of the terminal device, or the format of the received downlink control information is the second format, the at least one information field does not carry information indicated by a seventh information field, and a preset redundancy version is used for the data transmission scheduled by using the downlink control information; or the at least one information field includes a seventh information field, the seventh information field is greater than or equal to one bit, a state value of the seventh information field corresponds to one of L redundancy versions, and L is a positive integer; and the seventh information field is used to indicate a redundancy version used for the data transmission scheduled by using the downlink control information.

In a possible design, when the downlink control information is received in the common search space or the common control resource set, or the format of the received downlink control information is the first format, the at least one information field does not carry information indicated by an eighth information field; or the at least one information field includes an eighth information field, the eighth information field is greater than or equal to one bit, the eighth information field that is greater than or equal to one bit is used to instruct the terminal device whether to report channel state measurement, and a manner of the channel state measurement includes one of performing measurement based on a reference signal of a closest synchronization data block, performing measurement based on a reference signal of a control resource set in which system information is located, and performing measurement based on a reference signal of a broadcast channel; and/or when the downlink control information is received in the specific search space or the specific control resource set of the terminal device, or the format of the received downlink control information is the second format, the at least one information field includes an eighth information field and a ninth information field, the eighth information field is greater than or equal to one bit, and the eighth information field that is greater than or equal to one bit is used to instruct the terminal device whether to report channel state measurement; and the ninth information field is greater than or equal to one bit, the ninth information field indicates one of V reference signals used to perform channel state measurement, the V reference signals used to perform channel state measurement are configured by using higher layer signaling, and V is a positive integer.

In a possible design, the at least one information field includes a tenth information field, and the tenth information field indicates an uplink control channel resource configured for the data transmission scheduled by using the downlink control information; and when the downlink control information is received in the common search space or the common control resource set, or the format of the received downlink control information is the first format, the tenth information field includes $\lceil \log_2 B \rceil$ bits, at least one state value of the $\lceil \log_2 B \rceil$ bits corresponds to one of B uplink control channel resources, each of the B uplink control channel resources corresponds to an index of one item in a fifth table, one item corresponds to one uplink control channel resource, the fifth table is configured by using system information, and B is a positive integer; and/or when the downlink control information is received in the specific search space or the specific control resource set of the terminal device, or the format of the received downlink control information is the second format, the tenth information field includes $\lceil \log_2 A \rceil$ bits, at least one state value of the $\lceil \log_2 A \rceil$ bits corresponds to one of A uplink control channel resources, each of the A uplink control channel resources corresponds to an index of one item in a sixth table, one item corresponds to one uplink control channel resource, and the sixth table is configured by using user-specific higher layer signaling.

In a possible design, when the downlink control information is received in the common search space or the common control resource set, or the format of the received downlink control information is the first format, the at least one information field does not carry information indicated by an eleventh information field, and the eleventh information field indicates an assumption of a quasi-co-located relationship between a demodulation reference signal port used for the data transmission scheduled by using the downlink control information and a downlink reference signal port; and the downlink control information instructs the terminal device to determine, based on a quasi-co-located relationship of the search space in which the downlink control information is located or the control resource set in which the downlink control information is located, the assumption of the quasi-co-located relationship for the data transmission scheduled by using the downlink control information; and/or when the downlink control information is received in the specific search space or the specific control resource set of the terminal device, or the format of the received downlink control information is the second format, the at least one information field does not carry information indicated by an eleventh information field, and the eleventh information field indicates an assumption of a quasi-co-located relationship between a demodulation reference signal port used for the data transmission scheduled by using the downlink control information and a downlink reference signal port; and the downlink control information instructs the terminal device to determine, based on a predefined quasi-co-located relationship assumption, the assumption of the quasi-co-located relationship for the data transmission scheduled by using the downlink control information; or the downlink control information instructs the terminal device to determine, based on a quasi-co-located relationship of the search space in which the downlink control information is located or the control resource set in which the downlink control information is located, the assumption of the quasi-co-located relationship for the data transmission scheduled by using the downlink control information.

According to a second aspect, a method for determining downlink control information by a network device is provided. The method includes:

determining downlink control information, where the downlink control information includes at least one information field; and sending the downlink control information in a common search space or a common control resource set; or sending the downlink control information in a specific search space or a specific control resource set of a terminal device.

In a possible design, the at least one information field includes a first information field, the first information field indicates a format of the downlink control information, the format of the downlink control information is one of a plurality of formats, and the plurality of formats correspond to a same quantity of bits.

In a possible design, the first information field further indicates a transmission direction of data transmission scheduled by using the downlink control information.

In a possible design, when the downlink control information is sent in the common search space or the common control resource set, or the format of the sent downlink control information is a first format, the at least one information field does not carry information indicated by a second information field; and/or when the downlink control information is sent in the specific search space or the specific control resource set of the terminal device, or the format of the sent downlink control information is a second format, the at least one information field includes a second information field; and the method further includes: sending higher layer signaling, where the higher layer signaling indicates that the downlink control information includes the second information field, and/or the higher layer signaling indicates a quantity of bits of the second information field; and the second information field indicates a carrier corresponding to the data transmission scheduled by using the downlink control information, or the second information field indicates whether a time-frequency resource that is not occupied in a pre-configured resource set can be occupied by the data transmission scheduled by using the downlink control information.

In a possible design, the at least one information field includes a third information field, and the third information field indicates a frequency domain resource location occupied by the data transmission scheduled by using the downlink control information; and when the downlink control information is sent in the common search space or the common control resource set, or the format of the sent downlink control information is the first format, the downlink control information is scrambled by using a first radio network temporary identifier, the frequency domain location indicated by the third information field is in a first bandwidth part, and a location of a reference physical resource block 0 of the frequency domain resource location indicated by the third information field is a physical resource block 0 in the first bandwidth part; or the downlink control information is scrambled by using a second radio network temporary identifier, the frequency domain resource location indicated by the third information field in the downlink control information is in a second bandwidth part, and a location of a reference physical resource block 0 of the frequency domain resource location indicated by the third information field is a physical resource block 0 in the second bandwidth part; and/or when the downlink control information is sent in the specific search space or the specific control resource set of the terminal device, or the format of the sent downlink control information is the second format, the frequency domain resource location correspondingly indicated by the third information field in the downlink control information is in a third bandwidth part, and a location of a reference physical resource block 0 of the frequency domain resource location indicated by the third information field is a physical resource block 0 in the third bandwidth part.

In a possible design, when the downlink control information is sent in the common search space or the common control resource set, or the format of the sent downlink control information is the first format, the at least one information field does not carry information indicated by a fourth information field, the downlink control information corresponds to preset time domain resource information, and the preset time domain resource information indicates a time domain resource location occupied by the data transmission scheduled by using the downlink control information; or the at least one information field includes the fourth information field, the fourth information field includes $\lceil \log_2 N \rceil$ bits, at least one state value of the $\lceil \log_2 N \rceil$ bits corresponds to a row in a first table, at least one row in the first table indicates at least one of a start symbol, a symbol length, and an end symbol, and N is a positive integer; and/or when the downlink control information is sent in the specific search space or the specific control resource set of the terminal device, or the format of the sent downlink control information is the second format, the at least one information field includes the fourth information field, the fourth information field includes $\lceil \log_2 M \rceil$ bits, at least one state value of the $\lceil \log_2 M \rceil$ bits corresponds to a row in a second table, at least one row in the second table indicates at least one of a start symbol, a symbol length, and an end symbol, and M is a positive integer; and the fourth information field indicates the time domain resource location occupied by the data transmission scheduled by using the downlink control information.

In a possible design, the first table consists of N rows in a third table, at least one row in the third table indicates at least one of a start symbol, a symbol length, and an end symbol, and the third table is stipulated in a protocol, or the third table is configured by using higher layer signaling; and/or the second table consists of M rows in a fourth table, at least one row in the fourth table indicates at least one of a start symbol, a symbol length, and an end symbol, and the fourth table is stipulated in a protocol, or the fourth table is configured by using higher layer signaling.

In a possible design, when the downlink control information is sent in the common search space or the common control resource set, or the format of the sent downlink control information is the first format, the at least one information field does not carry information indicated by a fifth information field, the downlink control information corresponds to a preset K value, and the preset K value indicates a time interval between a receiving time of data scheduled by using the downlink control information and a transmitting time of a HARQ feedback corresponding to the data; or the at least one information field includes a fifth information field, the fifth information field includes $\lceil \log_2 P \rceil$ bits, at least one state value of the $\lceil \log_2 P \rceil$ bits corresponds to one of P K values, each of the P K values indicates a time interval between a receiving time of data scheduled by using the downlink control information and a transmitting time of a HARQ feedback corresponding to the data, and P is a positive integer; and/or when the downlink control information is sent in the specific search space or the specific control resource set of the terminal device, or the format of the sent downlink control information is the second format, the at least one information field includes a fifth information field; and the method further includes: sending configuration information, where the configuration information indicates a set of K values, the set of K values includes Q K values, the fifth information field includes $\lceil \log_2 Q \rceil$ bits, at least one state value of the $\lceil \log_2 Q \rceil$ bits corresponds to one of the Q K values, each of the Q K values indicates a time interval between a receiving time of data scheduled by using the downlink control information and a transmitting time of a HARQ feedback corresponding to the data, and Q is a positive integer.

In a possible design, when the downlink control information is sent in the common search space or the common control resource set, or the format of the sent downlink control information is the first format, the at least one information field does not carry information indicated by a sixth information field; and/or when the downlink control information is sent in the specific search space or the specific control resource set of the terminal device, or the format of the sent downlink control information is the second format, the at least one information field includes a sixth information field, and the sixth information field is greater than or equal to one bit; and the sixth information field indicates whether the terminal device needs to report aperiodic channel quality information (CQI), and/or the sixth information field instructs the terminal device whether to perform sounding reference signal (SRS) measurement.

In a possible design, when the downlink control information is sent in the common search space or the common control resource set, or the format of the sent downlink control information is the first format, the at least one information field includes a seventh information field, the seventh information field is greater than or equal to one bit, a state value of the seventh information field corresponds to one of X redundancy versions, and X is a positive integer; and/or when the downlink control information is sent in the specific search space or the specific control resource set of the terminal device, or the format of the sent downlink control information is the second format, the at least one information field does not carry information indicated by a seventh information field, and a preset redundancy version is used for the data transmission scheduled by using the downlink control information; or the at least one information field includes a seventh information field, the seventh information field is greater than or equal to one bit, a state value of the seventh information field corresponds to one of L redundancy versions, and L is a positive integer; and the seventh information field is used to indicate a redundancy version used for the data transmission scheduled by using the downlink control information.

In a possible design, when the downlink control information is sent in the common search space or the common control resource set, or the format of the sent downlink control information is the first format, the at least one information field does not carry information indicated by an eighth information field; or the at least one information field includes an eighth information field, the eighth information field is greater than or equal to one bit, the eighth information field that is greater than or equal to one bit is used to instruct the terminal device whether to report channel state measurement, and a manner of the channel state measurement includes one of performing measurement based on a reference signal of a closest synchronization data block, performing measurement based on a reference signal of a control resource set in which system information is located, and performing measurement based on a reference signal of a broadcast channel; and/or when the downlink control information is sent in the specific search space or the specific control resource set of the terminal device, or the format of the sent downlink control information is the second format, the at least one information field includes an eighth information field and a ninth information field, the eighth information field is greater than or equal to one bit, and the eighth information field that is greater than or equal to one bit is used to instruct the terminal device whether to report channel state measurement; and the ninth information field is greater than or equal to one bit, the ninth information field indicates one of V reference signals used to perform channel state measurement, the V reference signals used to perform channel state measurement are configured by using higher layer signaling, and V is a positive integer.

In a possible design, the at least one information field includes a tenth information field, and the tenth information field indicates an uplink control channel resource configured for the data transmission scheduled by using the downlink control information; and when the downlink control information is sent in the common search space or the common control resource set, or the format of the sent downlink control information is the first format, the tenth information field includes $\lceil \log_2 B \rceil$ bits, at least one state value of the $\lceil \log_2 B \rceil$ bits corresponds to one of B uplink control channel resources, each of the B uplink control channel resources corresponds to an index of one item in a fifth table, one item corresponds to one uplink control channel resource, the fifth table is configured by using system information, and B is a positive integer; and/or when the downlink control information is sent in the specific search space or the specific control resource set of the terminal device, or the format of the sent downlink control information is the second format, the tenth information field includes $\lceil \log_2 A \rceil$ bits, at least one state value of the $\lceil \log_2 A \rceil$ bits corresponds to one of A uplink control channel resources, each of the A uplink control channel resources corresponds to an index of one item in a sixth table, one item corresponds to one uplink control channel resource, and the sixth table is configured by using user-specific higher layer signaling.

In a possible design, when the downlink control information is sent in the common search space or the common control resource set, or the format of the sent downlink control information is the first format, the at least one information field does not carry information indicated by an eleventh information field, and the eleventh information field indicates an assumption of a quasi-co-located relationship between a demodulation reference signal port used for the data transmission scheduled by using the downlink control information and a downlink reference signal port; and the downlink control information instructs the terminal device to determine, based on a quasi-co-located relationship of the search space in which the downlink control information is located or the control resource set in which the downlink control information is located, the assumption of the quasi-co-located relationship for the data transmission scheduled by using the downlink control information; and/or when the downlink control information is sent in the specific search space or the specific control resource set of the terminal device, or the format of the sent downlink control information is the second format, the at least one information field does not carry information indicated by an eleventh information field, and the eleventh information field indicates an assumption of a quasi-co-located relationship between a demodulation reference signal port used for the data transmission scheduled by using the downlink control information and a downlink reference signal port; and the downlink control information instructs the terminal device to determine, based on a predefined quasi-co-located relationship assumption, the assumption of the quasi-co-located relationship for the data transmission scheduled by using the downlink control information; or the downlink control information instructs the terminal device to determine, based on a quasi-co-located relationship of the search space in which the downlink control information is located or the control resource set in which the downlink control information is located, the assumption of the quasi-co-located relationship for the data transmission scheduled by using the downlink control information.

According to a third aspect, this application provides a terminal device. The terminal device has a function of implementing a behavior of the terminal device in the method according to the first aspect. The function may be implemented by using hardware, or may be implemented by hardware executing corresponding software. The hardware or software includes one or more modules corresponding to the foregoing function.

According to a fourth aspect, this application provides a network device. The network device has a function of implementing a behavior of the network device in the method according to the second aspect. The function may be implemented by using hardware, or may be implemented by hardware executing corresponding software. The hardware or software includes one or more modules corresponding to the foregoing function.

According to a fifth aspect, this application provides a terminal device. The terminal device includes a processor and a transceiver. The processor is configured to support the terminal device in performing a corresponding function in the foregoing method, for example, determining the downlink control information in the foregoing method. The transceiver is configured to support the terminal device in sending/receiving information in the foregoing method, for example, receiving the downlink control information. In a possible design, a structure of the terminal device may further include a memory. The memory is configured to: be coupled to the processor, and store a program instruction and data that are necessary to the terminal device.

According to a sixth aspect, this application provides a network device. The network device includes a processor. The processor is configured to support the network device in performing a corresponding function in the foregoing method, for example, determining the downlink control information in the foregoing method. In a possible design, the network device may further include a transceiver. The transceiver is configured to support the network device in sending/receiving information in the foregoing method, for example, sending the downlink control information. In a possible design, a structure of the network device may further include a memory. The memory is configured to: be coupled to the processor, and store a program instruction and data that are necessary to the network device.

According to a seventh aspect, this application provides a communication system. The system includes the terminal device and the network device according to the foregoing aspects. The terminal device and the network device communicate with each other to perform the method for determining downlink control information according to the foregoing aspects.

According to an eighth aspect, this application provides a computer storage medium, configured to store a computer software instruction used by the foregoing terminal device. The computer software instruction includes a program designed for performing the foregoing aspects.

According to a ninth aspect, this application provides a computer storage medium, configured to store a computer software instruction used by the foregoing network device. The computer software instruction includes a program designed for performing the foregoing aspects.

According to a tenth aspect, this application provides a chip system. The chip system includes a processor, configured to support a terminal device in implementing a function according to the foregoing aspects, for example, determining the downlink control information in the foregoing method. In a possible design, the chip system further includes a memory, and the memory is configured to store a program instruction and data that are necessary to the terminal device. The chip system may include a chip, or may include a chip and another discrete device.

According to an eleventh aspect, this application provides a chip system. The chip system includes a processor, configured to support a network device in implementing a function according to the foregoing aspects, for example, determining the downlink control information in the foregoing method. In a possible design, the chip system further includes a memory, and the memory is configured to store a program instruction and data that are necessary to the network device. The chip system may include a chip, or may include a chip and another discrete device.

According to a twelfth aspect, an embodiment of this application provides a method for determining downlink control information by a terminal device. The method includes:

receiving, by the terminal device, downlink control information, where the downlink control information includes an index value of a modulation and coding scheme (MCS), the index value of the MCS is at least one of N index values in an MCS table, a modulation scheme corresponding to an index value X in the N index values is quadrature phase shift keying (QPSK), and a value obtained by multiplying a corresponding code rate by 1024 is less than or equal to 82; and determining, by the terminal device based on the index value of the MCS, a modulation scheme and a code rate that are used for data transmission.

Optionally, the index value X is an index value 1.

Optionally, a value obtained by multiplying the code rate corresponding to the index value X by 1024 is greater than or equal to 43; and/or an efficiency value is greater than or equal to 0.083579, and/or an efficiency value is less than or equal to 0.1592.

Optionally, the modulation scheme in the MCS table is that a value obtained by multiplying the code rate corresponding to the index value X by 1024 includes at least one of the following values:

82, 65, 54, 46, and 43.

Optionally, the modulation scheme in the MCS table is that a value obtained by multiplying the code rate corresponding to the index value X by 1024 includes at least one of the following values:

81, 64, 59, 46, and 43.

Optionally, a modulation scheme corresponding to each of an index value 12 to an index value 15 in the MCS table is 16QAM.

Optionally, the N index values in the MCS table correspond to at least two coding schemes and a non-coding scheme, specifically including:

an index value 0 does not correspond to data and a coding scheme, a coding scheme corresponding to the index value X is Polar, a coding scheme corresponding to an index value Y is low density parity check (LDPC), and the index value Y is greater than the index value X.

Optionally, the MCS table corresponds to at least two block error rates (BLERs), and the at least two BLERs specifically include a first BLER corresponding to the index value X and a second BLER corresponding to the index value Y, where the index value Y is greater than the index value X. Further optionally, the second BLER is less than the first BLER.

Optionally, in the MCS table, a quantity of index corresponding to a coding scheme LDPC is greater than or equal to a quantity of index corresponding to a coding scheme Polar.

Optionally, the MCS table corresponds to at least one BLER, and the BLER is at least one of the following: 10e-1, 10e-2, 10e-3, 10e-4, and 10e-5.

Beneficial effects of the embodiments of this application include: An existing long term evolution (LTE) system supports only a 10e-1 MCS table, but a plurality of BLERs have already been introduced in the 5G new radio (NR) systems. Therefore, the table in the existing technologies may not be suitable for a 5G system. Further, in consideration of service features of the URLLC, an MCS at a lower code rate needs to be introduced. Therefore, in this application, MCS indication information that can be implemented under different BLERs may be provided, so that the 5G NR system supports MCS indications corresponding to a plurality of BLERs, thereby satisfying the requirement for supporting the URLLC service.

BRIEF DESCRIPTION OF DRAWINGS

The following briefly describes the accompanying drawings used in describing the technical solutions in the embodiments of this application.

DETAILED DESCRIPTION

Figure 1:
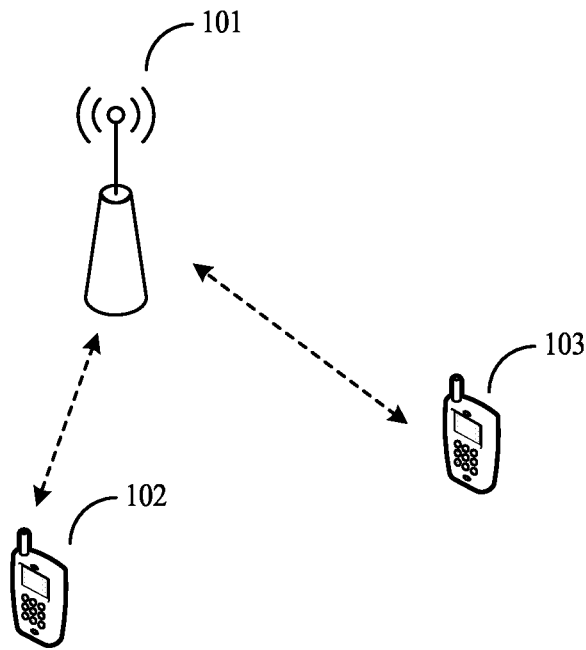
FIG. 1 is a schematic diagram of a possible application scenario according to this application.

The following describes the technical solutions in the embodiments of this application with reference to the accompanying drawings.

First, technical concepts related to the embodiments of this application are briefly described.

Time domain of an LTE system is identified by a radio frame. One radio frame includes 10 subframes, a length of each subframe is 1 millisecond, each subframe includes two slots, and each slot is 0.5 millisecond.

A quantity of symbols included in each slot is related to a length of a cyclic prefix (CP) in the subframe. If the CP is a common CP, each slot includes seven symbols, and each subframe includes 14 symbols. For example, each subframe includes symbols whose sequence numbers are #0, #1, #2, #3, #4, #5, #6, #7, #8, #9, #10, #11, #12, and #13. If the CP is a long CP, each slot includes six symbols, and each subframe includes 12 symbols. For example, each subframe includes symbols whose sequence numbers are #0, #1, #2, #3, #4, #5, #6, #7, #8, #9, #10, and #11.

A 5G system is used as an example. There are a plurality of service types in the 5G system, and the plurality of service types correspond to different service requirements. For example, an ultra-reliable and low latency communication (URLLC) scenario requires a low latency and high reliability, an enhanced mobile broadband (EMBB) scenario requires high spectral efficiency and has no latency requirement, a massive machine type communication (mMTC) scenario requires periodic low power transmission, and so on. Therefore, to satisfy requirements of different scenarios, the length of a subframe in the 5G system may or may not be 1 millisecond. In the 5G system, each subframe includes a plurality of symbols, and a length of the subframe depends on different subcarrier spacings. If a subcarrier spacing is 15 KHz, the length of the subframe is 1 millisecond; or if a subcarrier spacing is greater than 15 KHz, the length of the subframe may be less than 1 millisecond. The 5G system may include transmission of a plurality of subcarrier spacings. Therefore, time lengths of subframes corresponding to different subcarrier spacings may be different, and intervals of symbols corresponding to different subcarrier spaces may also be different.

It should be noted that in the embodiments of this application, the symbols include uplink symbols and downlink symbols. A symbol may be a single carrier frequency division multiple access (SC-FDMA) symbol, or may be a cyclic prefix orthogonal frequency division multiplexing (CP-OFDM) symbol, or may be another orthogonal frequency division multiplexing (OFDM) symbol. Uplink multiple access modes and downlink multiple access modes are not limited in this application.

A network device sends downlink control information (DCI) to a terminal device for scheduling data transmission. The DCI may include at least one information field. Different information fields may indicate different information, to instruct the terminal device to perform different processing tasks. For example, the DCI may include an information field to indicate a physical uplink shared channel (PUSCH) power level. To be specific, the network device instructs the terminal device to send a PUSCH using the PUSCH power level indicated by the information field. The DCI includes uplink DCI and downlink DCI. The uplink DCI is used to schedule uplink data transmission, and the downlink DCI is used to schedule downlink data transmission.

A downlink control channel is a channel used to carry the DCI. The downlink control channel may be a physical downlink control channel (PDCCH), or an enhanced PDCCH, or a channel that is defined in a future version and that is used to carry the DCI. For example, if a channel carrying the DCI is located in a physical downlink shared channel (PDSCH) area, the channel is also considered as a downlink control channel.

A search space includes one or more candidate downlink control channels, and each candidate downlink control channel can be used to carry the DCI. A control resource set, which may be referred to as a CORESET, includes one or more time-frequency resources used to transmit a downlink control channel. There are mainly three control resource sets: a CORESET configured by using a broadcast channel, where the CORESET is used to schedule a system message and a paging message, and may be referred to as a CORESET 1; a CORESET configured by using system information, where the CORESET is used to schedule data in a random access process, and may be referred to as a CORESET 2; and a CORESET 3 configured by using user-specific higher layer signaling, where the CORESET 3 is used to schedule data transmission after normal access of a terminal device. The terminal device needs to monitor a candidate downlink control channel in an available CORESET that is already activated. Therefore, the search space is a set of candidate downlink control channels monitored by the terminal device. For example, the search space includes one or more PDCCHs, and the search space may be referred to as a PDCCH search space. For another example, the search space includes one or more enhanced PDCCHs, and the search space may be referred to as an enhanced PDCCH search space.

The higher layer signaling may be signaling sent by a higher protocol layer, and the higher protocol layer is at least one of all protocol layers above a physical layer. The higher protocol layer may be specifically at least one of the following protocol layers: a medium access control (MAC) layer, a radio link control (RLC) layer, a packet data convergence protocol (PDCP) layer, a radio resource control (RRC) layer, a non-access stratum (NAS), and the like.

The embodiments of this application provide a plurality of methods for determining downlink control information and apparatuses, to better satisfy service requirements and scenario requirements. Without loss of generality, the embodiments of this application are described with reference to a network device and a terminal device.

The embodiments of this application can be applied to various wireless communication systems such as a global system for mobile communication (GSM), a code division multiple access (CDMA) system, a wideband code division multiple access (WCDMA) system, a general packet radio service (GPRS) system, and a universal mobile telecommunication system (UMTS), and can be especially applied to an LTE system, an LTE-A system, and an NR system.

The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a station (ST) in a wireless local area network (WLAN); or may be a cellular phone, a cordless phone, a session initiation protocol (SIP) phone, a wireless local loop (WLL) station, a personal digital assistant (PDA) device, a handheld device or a computing device that has a wireless communication function, another processing device connected to a wireless modem, an in-vehicle device, or a wearable device; or may be a terminal device in a next-generation communication system, for example, a terminal device in a 5G system, a terminal device in a future evolved public land mobile network (PLMN), or a terminal device in an NR system.

By way of example and not limitation, in the embodiments of this application, the terminal device may be alternatively a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, a data exchange, and cloud interaction. Generalized wearable intelligent devices include full-featured and large-size devices, such as smartwatches or smart glasses that can implement all or some functions without depending on smartphones, and devices, such as various smart bands or smart jewelries for vital sign monitoring, that focus on only one type of application functions and need to work with other devices such as smartphones.

The network device may be a device that is configured to communicate with a mobile device. For example, the network device may be an access point (AP) in a WLAN; a base transceiver station (BTS) in a GSM or CDMA, a NodeB (NB) in WCDMA; an evolved NodeB (eNB or eNodeB), a relay station, an access point, an in-vehicle device, or a wearable device in LTE; a network device in a future 5G system; a network device in a future evolved PLMN; or a new generation gNodeB (gNodeB) in an NR system.

In the embodiments of this application, the network device serves a cell, and the terminal device communicates with the network device by using a transmission resource (for example, a frequency domain resource or a spectrum resource) used by the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells are characterized by small coverage and low transmit power, and are suitable for providing high-rate data transmission services.

In addition, in an LTE system or an NR system, a plurality of cells may work on a carrier at a same frequency. In some special scenarios, it may also be considered that the concept of carrier is equivalent to the concept of cell. For example, in a carrier aggregation (CA) scenario, when a secondary component carrier is configured for a terminal device, a carrier index of the secondary component carrier and a cell identity (Cell ID) of a secondary serving cell operating on the secondary component carrier are both carried. In this case, it may be considered that the concept of carrier is equivalent to the concept of cell. For example, access by the terminal device to a carrier is equivalent to access to a cell.

The method and the device provided in the embodiments of this application can be applied to various communication apparatuses, for example, applied to a terminal device or a network device. The terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a UNIX™ operating system, an Android™ operating system, an iOS™ operating system, or a Windows™ operating system. The application layer includes applications such as a browser, a contact list, word processing software, and instant messaging software. In addition, in the embodiments of this application, a specific structure of an execution body of the method provided in the embodiments of this application is not specifically limited, provided that communication can be performed, by running a program in which code of the method provided in the embodiments of this application is recorded, based on the method provided in the embodiments of this application. For example, an execution body of the method provided in the embodiments of this application may be a terminal device or a network device, or a function module that is in a terminal device or a network device and that can invoke and execute the program.

In addition, aspects or features in the embodiments of this application may be implemented as a method, a device, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or are configured to transmit an instruction and/or data.

In addition, in this specification, "a plurality of" refers to two or more than two. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects.

FIG. 1 is a schematic diagram of an application scenario to which a solution according to an embodiment of this application can be applied. As shown in FIG. 1, the application scenario includes a cell base station 101, and a terminal device 102 and a terminal device 103 that are located within coverage of the cell base station 101 and that communicate with the cell base station 101. The cell base station 101 may be a base station in an LTE system, the terminal device 102 and the terminal device 103 may be corresponding devices in the LTE system, the cell base station 101 and the terminal device 102 are both devices supporting short transmission time interval (TTI) transmission, and the terminal device 103 is a device not supporting the short TTI (sTTI) transmission. The cell base station 101 may communicate with the terminal device 102 by using a short TTI or a normal TTI of 1 millisecond (ms). The cell base station 101 may communicate with the terminal device 103 by using the normal TTI of 1 ms.

Figure 2:
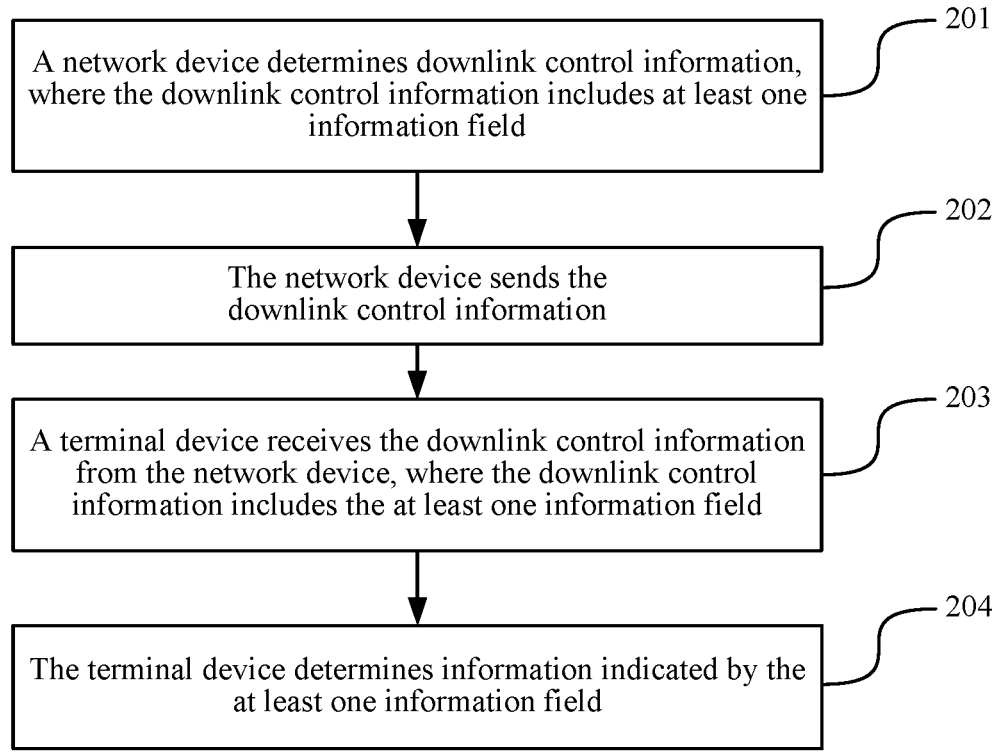
FIG. 2 is a schematic diagram of a process of determining downlink control information by a network device and a terminal device according to this application.

FIG. 2 is a schematic diagram of an interaction process of determining downlink control information according to an embodiment of this application. The embodiment in FIG. 2 is described by using an example in which a network device determines downlink control information (DCI) and sends the downlink control information to a terminal device, and the terminal device receives the downlink control information from the network device and determines the received downlink control information. However, the embodiments of this application are not limited thereto. Any communication scenario for determining the downlink control information is applicable to the technical solutions provided in the embodiments of this application.

Step 201: The network device determines downlink control information, where the downlink control information includes at least one information field.

In this embodiment of the application, the downlink control information may include one or more information fields. The one or more information fields may be used to indicate one or more types of information. For example, the one or more types of information may be carrier information used for transmission of data scheduled on a downlink control channel, information about a time-frequency resource occupied by the data scheduled on the downlink control channel, a modulation and coding scheme used for the data scheduled on the downlink control channel, a redundancy version used for the data scheduled on the downlink control channel, and the like, and all information that needs to be learned of in a process of sending or receiving data scheduled on a downlink data channel.

In an optional embodiment, the at least one information field includes a first information field, the first information field indicates a format of the downlink control information, the format of the downlink control information is one of a plurality of formats, and the plurality of formats correspond to a same quantity of bits.

In this embodiment of the application, unless otherwise specifically stated, a downlink control information format (DCI format) is referred to as a format for short. A quantity of bits corresponding to the format, or a quantity of bits of the downlink control information in the format, is a quantity of bits (payload size) that are actually sent when the network device sends the downlink control information in the format. The quantity of bits that are actually sent includes a quantity of information bits of actual control information, and may also include a quantity of padding bits. The quantity of bits of the downlink control information is also a quantity of bits (payload size) that are actually sent when the network device sends the downlink control information. Details are not described later again.

For example, the first information field is greater than or equal to one bit, and a state value of a bit of the first information field indicates the format of the downlink control information. When the plurality of formats include a first format and a second format, the first information field may indicate, by using one or more bits, that the downlink control information is in the first format or the second format. For example, when a state value of one bit in the first information field is "0", it indicates that the format of the downlink control information is the first format (or the second format), and when the state value of the bit is "1", it indicates that the format of the downlink control information is the second format (or the first format). When the plurality of formats include four formats, the first information field may indicate, by using a plurality of bits, that the format of the downlink control information is which one of the four formats. For example, four state values "00", "01", "10", and "11" of two bits in the first information field correspond to four formats. Optionally, the four formats include an uplink compact format, a downlink compact format, an uplink fallback format, and a downlink fallback format. The uplink compact format (downlink control information in the uplink compact format) and the uplink fallback format (downlink control information in the uplink fallback format) are used to schedule uplink data. The downlink compact format (downlink control information in the downlink compact format) and the downlink fallback format (downlink control information in the downlink fallback format) are used to schedule downlink data.

Optionally, in this embodiment of the application, the first format is a fallback format, and the second format is a compact format. Usually, downlink control information in the fallback format is used to schedule data when an RRC connection is not established or in an RRC reconfiguration process. A main feature of the downlink control information is that the downlink control information cannot include RRC configuration information; or a quantity of bits of the downlink control information is usually not affected by the configuration information, and content of the downlink control information cannot be affected by RRC signaling. In a fallback state, the downlink control information is used to maintain normal data scheduling. However, downlink control information in the compact format is usually used to schedule data of a scenario or a service having a relatively high requirement on reliability and/or a latency.

It should be noted that the sequence number identifiers, such as "first" and "second", used in this application are only descriptions used for ease of understanding and have no actual meaning, and other sequence number identifiers, such as a format A, a format B, an eighth format, and a tenth format, may be alternatively used. Moreover, unless otherwise specifically stated, the sequence number identifiers used in this embodiment of the application do not imply a sequence. For example, when a fifth format and a seventh format exist in this embodiment, it does not indicate that a sixth format also exists. In addition, different sequence number identifiers usually indicate different objects. Unless otherwise specifically stated, all sequence number identifiers in this embodiment of the application conform to the foregoing agreement, and details are not described again.

Step 202: The network device sends the downlink control information. The network device may send the downlink control information in a common search space or a common control resource set, or may send the downlink control information in a specific search space or a specific control resource set. Certainly, the network device may alternatively send the downlink control information in each search space or each control resource set.

In an optional embodiment, when the network device sends the downlink control information in the common search space or the common control resource set, the at least one information field indicates first information. When the network device sends the downlink control information in the specific search space or the specific control resource set, the at least one information field indicates second information. For example, the first information and the second information are scheduling information and/or control information. For example, the first information indicates: sending a PUSCH at a first power level, and/or performing PUSCH frequency hopping; and the second information indicates: sending a PUSCH at a second power level, and/or skipping PUSCH frequency hopping. The first information and the second information may be information indicated by any information field in this embodiment of the application.

When the network device sends the downlink control information in the common search space or the common control resource set, a quantity of bits of the downlink control information is a first quantity of bits (first payload size). When network device sends the downlink control information in the specific search space or the specific control resource set, a quantity of bits of the downlink control information is a second quantity of bits (second payload size). It should be specifically noted that, the first quantity of bits and the second quantity of bits may be different quantities of bits, or may be same. For example, the network device may send the downlink control information based on a same quantity of bits (same payload size). The same quantity of bits may be alternatively a preset quantity of bits (preset payload size). Therefore, in an optional embodiment, in step 202, the network device sends the downlink control information based on the preset quantity of bits. To be specific, in step 202, the network device may send the downlink control information in the common search space or the common control resource set based on the preset quantity of bits, or may send the downlink control information in the specific search space or the specific control resource set based on the preset quantity of bits. Further, when the network device sends the downlink control information in the common search space or the common control resource set based on the preset quantity of bits, the at least one information field indicates the first information. When the network device sends the downlink control information in the specific search space or the specific control resource set based on the preset quantity of bits, the at least one information field indicates the second information.

When the network device sends the downlink control information in the common search space or the common control resource set, the format of the downlink control information is the first format. When the network device sends the downlink control information in the specific search space or the specific control resource set, the format of the downlink control information is the second format. It should be specifically noted that the first format and the second format may be the same or may be different. If the first format and the second format are the same, to be specific, downlink control information in a format may be sent in different search spaces or control resource sets, but bit fields in the downlink control information in the format in different search spaces have different understandings or different quantities of bits. If the first format is different from the second format, to be specific, two types of control information are sent in the two search spaces, and bit fields of the two types of control information have no necessary relationship and may have different definitions and different understandings.

Optionally, in this embodiment of the application, the downlink control information sent in the common search space or the common control resource set may be in the fallback format or implement a downlink control information fallback function; and the downlink control information sent in the specific search space or the specific control resource set may be in the compact format or implement a downlink control information compacting function. Optionally, in this embodiment of the application, the downlink control information sent in the specific search space or the specific control resource set may be in the fallback format or implement a downlink control information fallback function; and the downlink control information sent in the common search space or the common control resource set may be in the compact format or implement a function of compact downlink control information.

Usually, downlink control information in the fallback format or implementing the downlink control information fallback function is used to schedule data when an RRC connection is not established or in an RRC reconfiguration process. A main feature of the downlink control information is that the downlink control information cannot include RRC configuration information; or a quantity of bits of the downlink control information is usually not affected by the configuration information, and content of the downlink control information cannot be affected by RRC signaling. In the fallback state, the downlink control information is used to maintain normal data scheduling. However, downlink control information in the compact format or implementing the downlink control information compacting function is usually used to schedule a scenario or a service having a relatively high requirement on reliability and/or a latency.

Step 203: The terminal device receives the downlink control information from the network device, where the downlink control information includes the at least one information field. The terminal device receives, by performing blind detection, the downlink control information sent by the network device. The terminal device performs blind detection in the common search space (or the common control resource set) and/or the specific search space (or the specific control resource set). If the network device sends the downlink control information in the common search space, the terminal device receives the downlink control information in the common search space. If the network device sends the downlink control information in the specific search space, the terminal device receives the downlink control information in the specific search space. It may be considered that, in step 203, the terminal device successfully receives the downlink control information sent by the network device.

For example, according to the foregoing embodiment, the downlink control information sent by the network device includes the first information field, the first information field indicates the format of the downlink control information, the format of the downlink control information is one of a plurality of formats, and the plurality of formats correspond to a same quantity of bits. The terminal device performs blind detection based on the same quantity of bits, so that the terminal device can successfully receive the downlink control information. In this case, the plurality of formats correspond to the same quantity of bits. Therefore, when blind detection is performed for the downlink control information in the plurality of formats, the terminal device needs to perform only one blind detection process in the common search space (or the common control resource set) and the specific search space (or the specific control resource set) based on the same quantity of bits. Certainly, in a communication system, if the downlink control information in the plurality of formats is sent only in the common search space (or the common control resource set), the terminal device may alternatively perform blind detection only in the common search space (or the common control resource set) based on the same quantity of bits. Correspondingly, if the downlink control information in the plurality of formats is sent only in the specific search space (or the specific control resource set), the terminal device may alternatively perform blind control only in the specific search space (or the specific control resource set) based on the same quantity of bits.

Step 204: The terminal device determines information indicated by the at least one information field.

For example, according to the foregoing embodiment, the first information field of the downlink control information received by the terminal device indicates the format of the downlink control information. Therefore, the terminal device may determine the format of the downlink control information based on the first information field. For example, when the plurality of formats include the first format and the second format, the terminal device may determine, based on one or more bits in the first information field, whether the format of the downlink control information is the first format or the second format. For example, when a state value of one bit in the first information field is "0", it is determined that the format of the downlink control information is the first format (or the second format), and when the state value of the bit is "1", it is determined that the format of the downlink control information is the second format (or the first format). Optionally, in this embodiment of the application, the first format is the fallback format, and the second format is the compact format. When the plurality of formats include four formats, the terminal device may determine, based on a plurality of bits in the first information field, that the format of the downlink control information is which one of the four formats. For example, four state values "00", "01", "10", and "11" of two bits in the first information field correspond to four formats. Optionally, the four formats include an uplink compact format, a downlink compact format, an uplink fallback format, and a downlink fallback format.

In an optional embodiment, when the terminal device receives the downlink control information in the common search space or the common control resource set, the terminal device determines that the at least one information field indicates the first information. When the terminal device receives the downlink control information in the specific search space or the specific control resource set, the terminal device determines that the at least one information field indicates the second information. For example, the first information indicates: sending a PUSCH at a first power level, and/or performing PUSCH frequency hopping; and the second information indicates: sending a PUSCH at a second power level, and/or skipping PUSCH frequency hopping.

When the terminal device receives the downlink control information in the common search space or the common control resource set, the downlink control information has a first quantity of bits (payload size). When the terminal device receives the downlink control information in the specific search space or the specific control resource set, the downlink control information has a second quantity of bits. It should be specifically noted that the first quantity of bits and the second quantity of bits may be the same or may be different. When the first quantity of bits and the second quantity of bits are the same, it means that the terminal device can receive the downlink control information in the common search space or the specific search space by performing one blind detection process. When the first quantity of bits and the second quantity of bits are different, it means that the terminal device can receive the downlink control information in the common search space or the specific search space by performing two blind detection processes. If downlink control information that needs to be detected has a same quantity of bits, the terminal device needs to perform only one blind detection process. If downlink control information that needs to be detected has different quantities of bits, the terminal device needs to perform a plurality of blind detection processes. A larger quantity of blind detection processes indicates higher power consumption.

Therefore, in an optional embodiment, for downlink control information having a same quantity of bits or a preset quantity of bits, the terminal device performs one blind detection process in the common search space (or the common control resource set) and the specific search space (or the specific control resource set) based on the same quantity of bits or the preset quantity of bits. To be specific, in step 203, the terminal device receives the downlink control information based on the preset quantity of bits. When the network device sends the downlink control information in the common search space or the common control resource set, in step 203, the terminal device receives the downlink control information in the common search space or the common control resource set based on the preset quantity of bits. When the network device sends the downlink control information in the specific search space or the specific control resource set, in step 203, the terminal device receives the downlink control information in the specific search space or the specific control resource set based on the preset quantity of bits. Further, the downlink control information includes the at least one information field. When the terminal device receives the downlink control information in the common search space or the common control resource set, the at least one information field indicates the first information. When the terminal device receives the downlink control information in the specific search space or the specific control resource set based on the preset quantity of bits, the at least one information field indicates the second information.

When the terminal device receives the downlink control information in the common search space or the common control resource set, the terminal device determines that the format of the downlink control information is the first format. When the terminal device receives the downlink control information in the specific search space or the specific control resource set, the terminal device determines that the format of the downlink control information is the second format. It should be specifically noted that the first format and the second format may be the same or may be different.

According to this embodiment of the application, the network device can flexibly determine a structure, the quantity of bits, and/or the indicated information of the downlink control information, and select an appropriate search space for sending the downlink control information. The terminal device receives, by performing a blind detection process, the downlink control information sent by the network device and determines the scheduling information and/or the control information indicated by the downlink control information, for completing data transmission based on content indicated by the downlink control information, to adapt to various communication scenarios. In addition, the network device may send a plurality of types of downlink control information in search spaces or control resource sets based on a same quantity of bits. When the terminal device needs to perform blind detection on the plurality of types of downlink control information, the terminal device can receive, by performing only one blind detection process, the downlink control information sent by the network device. This case is applicable to a scenario having a specific latency requirement and can save power. Further, the network device may alternatively send downlink control information in a same format in different search spaces, and a same information field in the downlink control information sent in the different search spaces has different definitions, so that the network device and the terminal device can flexibly send and receive the downlink control information, to better satisfy different scenario requirements. It is ensured that downlink control information that is in a plurality of formats and whose quantities of information bits are close has a same actual quantity of bits, and a header field is added at a start location of the downlink control information, to distinguish between the formats of the downlink control information whose quantities of bits are the same. A small quantity of overhead bits, namely, header overheads, can be used, to reduce a quantity of times of blind detection performed by the terminal device, thereby reducing power consumption of the terminal device, and reducing a latency.

In an embodiment of this application, a second information field is used to indicate a carrier corresponding to data transmission scheduled by using the downlink control information. For example, the network device may indicate, to the terminal device by using the second information field included in the downlink control information, the carrier used for the data transmission scheduled by using the downlink control information. After determining information indicated by the second information field, the terminal device transmits data based on the carrier indicated by the second information field. In another embodiment of this application, the second information field is used to indicate whether a time-frequency resource that is not occupied in a pre-configured resource set can be occupied by the data transmission scheduled by using the downlink control information. For example, the pre-configured resource set may be configured by using higher layer signaling or determined in a protocol, and the network device indicates, to the terminal device by using the second information included in the downlink control information, whether an available resource in the set can be occupied by the data transmission scheduled by using the downlink control information. It should be noted that, the at least one information field included in the downlink control information determined by the network device includes one or more information fields having a same reference name. This is not limited in this embodiment of the application. For example, the at least one information field may include one second information field, or may include a plurality of second information fields. For example, when two second information fields are included, one of the two second information fields is used to indicate the carrier corresponding to the data transmission scheduled by using the downlink control information, and the other one of the two second information fields is used to indicate whether the time-frequency resource that is not occupied in the pre-configured resource set can be occupied by the data transmission scheduled by using the downlink control information.

In this embodiment of the application, that the at least one information field does not carry information indicated by an information field may mean that a bit of the information field in the downlink control information is 0 bits, to be specific, it may be understood that the downlink control information does not include the information field, or it may be understood that the downlink control information includes the information field, but no bit is allocated to the information field. Alternatively, the information field is in a reserved state. In this case, the information field is greater than or equal to one bit, but the information field is in the reserved state. Therefore, information indicated by the information field is invalid or does not exist. Similar or same concepts are not described later again.

Figure 3:
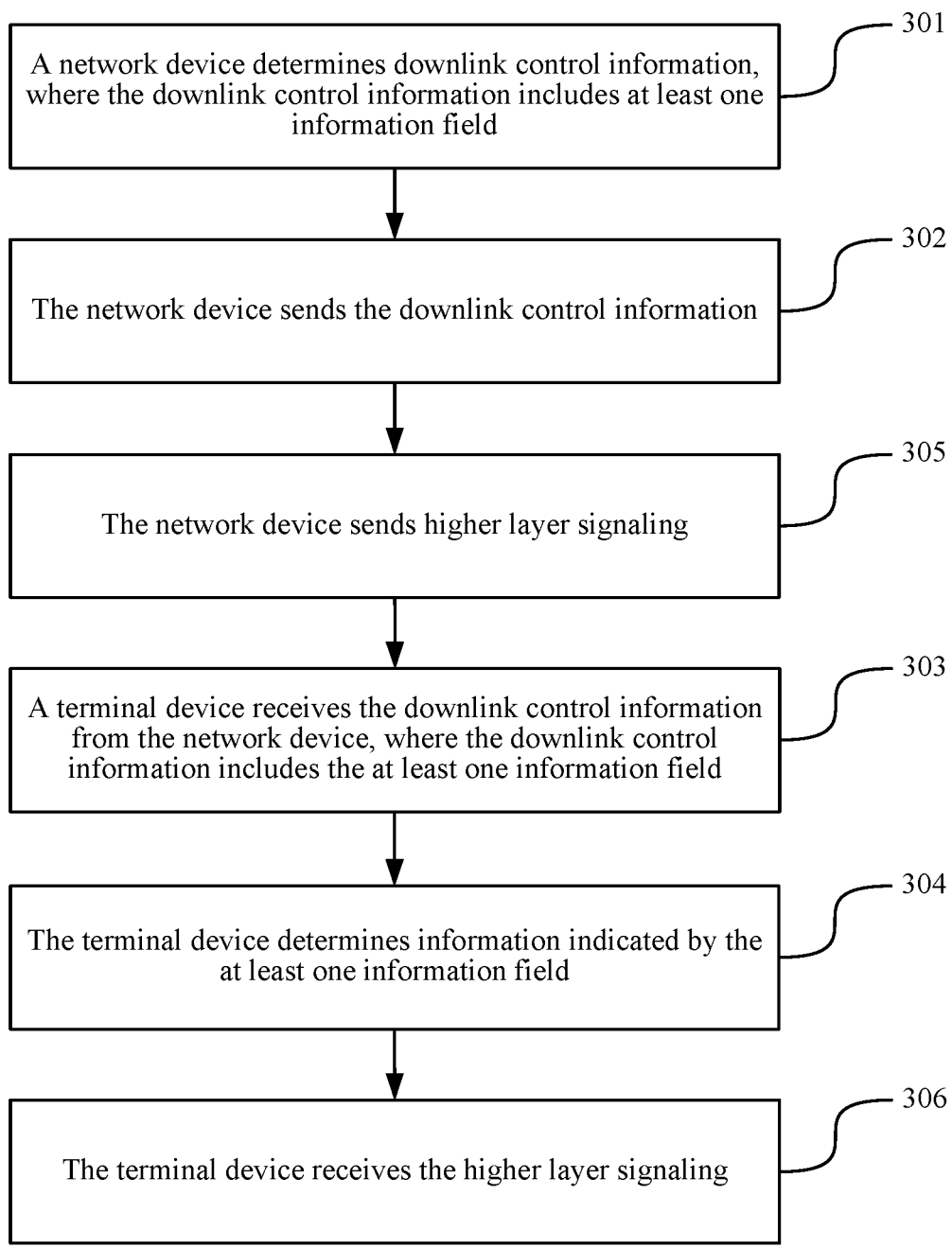
FIG. 3 is a schematic diagram of another process of determining downlink control information by a network device and a terminal device according to this application.

In this embodiment of the application, the network device may further send higher layer signaling. The higher layer signaling indicates whether the downlink control information includes the at least one information field, and/or the higher layer signaling indicates a quantity of bits of the at least one information field. As shown in FIG. 3, step 301 to step 304 are similar to step 201 to step 204, and details are not described again. In step 305, the network device sends the higher layer signaling. In step 306, the terminal device receives the higher layer signaling. The terminal device may determine, as indicated by the higher layer signaling, whether the downlink control information includes the at least one information field. It should be noted that an execution order of step 305 and step 306 relative to step 301 to step 304 is not limited in this embodiment, and step 305 and step 306 may be performed in any logical order.

In an embodiment of this application, the network device sends the downlink control information in the common search space or the common control resource set, and the at least one information field in the downlink control information does not carry the information indicated by the second information field. Alternatively, the network device sends the downlink control information, the downlink control information is in the first format, and the at least one information field in the downlink control information does not carry the information indicated by the second information field. To be specific, the at least one information field in the downlink control information sent in the common search space or the common control resource set does not carry the information indicated by the second information field, or the at least one information field in the downlink control information in the first format does not carry the information indicated by the second information field. Correspondingly, the terminal device receives the downlink control information in the common search space or the common control resource set, and/or the downlink control information received by the terminal device is in the first format.

With reference to the foregoing embodiment, the network device sends the downlink control information in the specific search space or the specific control resource set, and/or the downlink control information sent by the network device is in the second format. Correspondingly, the terminal device receives the downlink control information in the specific search space or the specific control resource set, and/or the downlink control information received by the terminal device is in the second format. For this case, the network device further sends higher layer signaling. The higher layer signaling indicates that the downlink control information includes the second information field and/or indicates a quantity of bits of the second information field. To be specific, after receiving the higher layer signaling, the terminal device may determine, by using the higher layer signaling, whether the downlink control information includes the second information field and/or determine the quantity of bits of the second information field by using the higher layer signaling.

According to the method in this embodiment, if the terminal device receives the downlink control information in the common search space or the common control resource set, or the terminal device determines that the received downlink control information is in the first format, the downlink control information does not include indication information of a carrier indicator field or a resource sharing field. In this case, the terminal device works in the fallback state, and maintains only normal communication, thereby saving more power of the terminal device, and avoiding a communication failure and a waste of resources that are caused by different understandings of the network device and the terminal device in an RRC reconfiguration process performed for the terminal. If the terminal device receives the downlink control information in the specific search space or the specific control resource set, or the terminal device determines that the received downlink control information is in the second format, the downlink control information indicates the carrier of the data scheduling and/or resource sharing information. Therefore, cross-carrier scheduling can be implemented, scheduling flexibility can be improved, bandwidth for data transmission can be increased or reduced, and a data transmission rate can be increased. A preconfigured unused resource is allocated to a data channel for use, so that resource utilization can be improved.

In an embodiment of this application, the at least one information field includes a third information field, and the third information field indicates a frequency domain resource location occupied by the data transmission scheduled by using the downlink control information. The network device sends the downlink control information in the common search space or the common control resource set; or the network device sends the downlink control information, and the downlink control information is in the first format. Correspondingly, the terminal device receives the downlink control information in the common search space or the common control resource set, and/or the downlink control information received by the terminal device is in the first format. The downlink control information is scrambled by using a first radio network temporary identifier, the frequency domain resource location indicated by the third information field is in a first bandwidth part, and a location of a reference physical resource block 0 of the frequency domain resource location indicated by the third information field is a physical resource block 0 in the first bandwidth part; or the downlink control information is scrambled by using a second radio network temporary identifier, the frequency domain resource location indicated by the third information field in the downlink control information is in a second bandwidth part, and a location of a reference physical resource block 0 of the frequency domain resource location indicated by the third information field is a physical resource block 0 in the second bandwidth part. For example, the first radio network temporary identifier is a cell radio network temporary identifier (C-RNTI), and/or the second radio network temporary identifier is a random access radio network temporary identifier (RA-RNTI). The first bandwidth part (BWP) is a default bandwidth part (default BWP), and includes a default uplink bandwidth part and/or a default downlink bandwidth part. The second bandwidth part is an initial active bandwidth part (initial active BWP), and includes an initial active uplink bandwidth part and/or an initial active downlink bandwidth part. A third bandwidth part is a bandwidth part that is activated after a terminal device establishes an RRC connection, and also includes an uplink bandwidth part and/or a downlink bandwidth part. Any case in which scheduled data corresponding to different manners of scrambling the downlink control information is in different BWPs, and locations of reference physical resource blocks 0 of frequency domain resource locations indicated by the downlink control information are in different BWPs falls within the protection scope of the present application.

With reference to the foregoing embodiment, the network device sends the downlink control information in the specific search space or the specific control resource set, and/or the downlink control information sent by the network device is in the second format. Correspondingly, the terminal device receives the downlink control information in the specific search space or the specific control resource set, and/or the downlink control information received by the terminal device is in the second format. The frequency domain resource location correspondingly indicated by the third information field in the downlink control information is in a third bandwidth part, and a location of a reference physical resource block 0 of the frequency domain resource location indicated by the third information field is a physical resource block 0 in the third bandwidth part.

According to the method in this embodiment, after the terminal device receives downlink control information in different search spaces or different control resource sets, or receives downlink control information in different formats, frequency domain resource indication information is understood based on different downlink control information scrambling manners. In this way, during random access, paging, or normal data transmission, the network device and the terminal device may have a consistent understanding, to avoid a waste of resources caused by a data transmission failure this time due to BWP blurring in the process, to be specific, data sent by the network device is originally in a BWP 1, but a terminal device receives the data in a previously configured BWP.

In an embodiment of this application, the at least one information field includes the fourth information field, and the fourth information field indicates a time domain resource location occupied by the data transmission scheduled by using the downlink control information. The network device sends the downlink control information in the common search space or the common control resource set; or the network device sends the downlink control information, and the downlink control information is in the first format. Correspondingly, the terminal device receives the downlink control information in the common search space or the common control resource set, and/or the downlink control information received by the terminal device is in the first format. The at least one information field does not carry information indicated by the fourth information field. The downlink control information may correspond to preset time domain resource information, and the preset time domain resource information indicates the time domain resource location occupied by the data transmission scheduled by using the downlink control information; and/or the fourth information field includes $\lceil \log_2 N \rceil$ bits, at least one state value of the $\lceil \log_2 N \rceil$ bits corresponds to a row in a first table, at least one row in the first table indicates at least one of a start symbol, a symbol length, and an end symbol, and N is a positive integer.

With reference to the foregoing embodiment, the network device sends the downlink control information in the specific search space or the specific control resource set, and/or the downlink control information sent by the network device is in the second format. Correspondingly, the terminal device receives the downlink control information in the specific search space or the specific control resource set, the fourth information field includes $\lceil \log_2 M \rceil$ bits, at least one state value of the $\lceil \log_2 M \rceil$ bits corresponds to a row in a second table, at least one row in the second table indicates at least one of a start symbol, a symbol length, and an end symbol, and M is a positive integer. The first table and the second table may be configured by using signaling. For the first table and the second table, refer to Table 1.

As shown in Table 1, Table 1 includes five rows, and each row includes an index, and includes at least one of a start symbol, a symbol length, and an end symbol. For Table 1, a row that is in Table 1 and that corresponds to the fourth information field may be indicated by using three bits. For example, a state value of the three bits is "010", which corresponds to a row whose index is 2 in Table 1, so that the time domain resource location configured for the data transmission scheduled by using the downlink control information can be determined. For example, a start location of the downlink control information may be used as a reference for the start symbol in the table. A start symbol whose value is 0 is a symbol pointing to the start location of the downlink control information, the length in the table indicates a quantity of symbols from the start symbol, and the start location of the downlink control information may be used as a reference for the end symbol in the table.

TABLE 1

| Index | Start symbol | Length | End symbol |
|-------|--------------|--------|------------|
| 0 | 0 | 2 | 14 |
| 1 | 0 | 4 | 14 |
| 2 | 0 | 7 | Null |
| 3 | 0 | 14 | Null |
| 4 | 3 | Null | 14 |

Optionally, the first table consists of N rows in a third table, at least one row in the third table indicates at least one of a start symbol, a symbol length, and an end symbol, and the third table is stipulated in a protocol, or the third table is configured by using higher layer signaling; and/or the second table consists of M rows in a fourth table, at least one row in the fourth table indicates at least one of a start symbol, a symbol length, and an end symbol, and the fourth table is stipulated in a protocol, or the fourth table is configured by using higher layer signaling. For the third table and the fourth table, refer to Table 2.

As shown in Table 2, Table 2 includes a plurality of rows, and each row in Table 2 may include an index, and include at least one of a start symbol, a symbol length, and an end symbol. A complete table shown in Table 2 may be stipulated by using a protocol, so that the table does not need to be separately designed, and the terminal device or the network device determines to use which rows or items in the complete table as required only. For example, the first table in the foregoing embodiment may consists of rows corresponding to indexes 0 to 4 in Table 3. In this manner, the network device and the terminal device determine, based on a complete table, content to be used. Therefore, inconsistent understandings of the network device and the terminal device during RRC reconfiguration can be avoided, and flexibility can be provided, to satisfy latency requirements and the like of various services.

TABLE 2

| Index | Start symbol | Length | End symbol |
|-------|--------------|--------|------------|
| 0 | 0 | 2 | 14 |
| 1 | 0 | 4 | 14 |
| 2 | 0 | 7 | Null |
| 3 | 0 | 14 | Null |
| 4 | 3 | Null | 14 |
| 5 | 0 (default) | Null | 7 |
| 6 | 0 | Null | Null |
| ... | ... | ... | ... |

According to the method in this embodiment, if the terminal device receives the downlink control information in the common search space or the common control resource set, or the terminal device determines that the received downlink control information is in the first format, the downlink control information includes time domain resource indication information having a limited quantity of bits, for example, 2-bit time domain resource indication information. The indication information indicates a relatively small time domain resource table predefined in a protocol. Although the terminal device works in the fallback state, and maintains only normal communication in this case, mini slot-based scheduling and slot-based scheduling can be implemented, so that reliability requirements of different services are satisfied. In addition, a quantity of bits is relatively small, so that reliability of a control channel can be further improved. If the terminal device receives the downlink control information in the specific search space or the specific control resource set, or the terminal device determines that the received downlink control information is in the second format, the downlink control information includes time domain resource indication information having a limited quantity of bits, for example, 3-bit time domain resource indication information. The indication information indicates another time domain resource table configured by using higher layer signaling. In this way, flexible scheduling can be implemented, and different reliability requirements can be satisfied.

In an embodiment of this application, the network device sends the downlink control information in the common search space or the common control resource set; or the network device sends the downlink control information, and the downlink control information is in the first format. Correspondingly, the terminal device receives the downlink control information in the common search space or the common control resource set, and/or the downlink control information received by the terminal device is in the first format. The at least one information field does not carry information indicated by a fifth information field, the downlink control information corresponds to a preset K value, and the preset K value indicates a time interval between a receiving time of data scheduled by using the downlink control information and a transmitting time of a HARQ feedback corresponding to the data; or the at least one information field includes a fifth information field, the fifth information field includes $\lceil \log_2 P \rceil$ bits, at least one state value of the $\lceil \log_2 P \rceil$ bits corresponds to one of P K values, each of the P K values indicates a time interval between a receiving time of data scheduled by using the downlink control information and a transmitting time of a HARQ feedback corresponding to the data, and P is a positive integer. A K set includes the P K values, and this set is stipulated in a protocol.

With reference to the foregoing embodiment, the network device sends the downlink control information in the specific search space or the specific control resource set, and/or the downlink control information sent by the network device is in the second format. Correspondingly, the terminal device receives the downlink control information in the specific search space or the specific control resource set, and/or the downlink control information received by the terminal device is in the second format. The at least one information field includes a fifth information field; and the method further includes: sending configuration information, where the configuration information indicates a set of K values, the set of K values includes Q K values, the fifth information field includes $\lceil \log_2 Q \rceil$ bits, at least one state value of the $\lceil \log_2 Q \rceil$ bits corresponds to one of the Q K values, each of the Q K values indicates a time interval between a receiving time of data scheduled by using the downlink control information and a transmitting time of a HARQ feedback corresponding to the data, and Q is a positive integer. A K set includes the Q K values, and this set is configured by using higher layer signaling.

According to the method in this embodiment, if the terminal device receives the downlink control information in the common search space or the common control resource set, or the terminal device determines that the received downlink control information is in the first format, the downlink control information does not include the information indicating the time interval between a receiving time of data scheduled by using the downlink control information and a transmitting time of a HARQ feedback corresponding to the data, to avoid a transmission failure caused by inconsistent understandings of the network device and the terminal device during a blurring phase such as reconfiguration. If the downlink control information is sent in the specific search space or the specific control resource set, or the downlink control information is in the second format, the fifth information field indicates one value in a configured K set, to provide flexibility for scheduling on a network side, and avoid an uplink collision, thereby ensuring reliability.

In an embodiment of this application, the at least one information field includes a sixth information field, and the sixth information field indicates whether the terminal device needs to report aperiodic channel quality information (CQI), and/or the sixth information field instructs the terminal device whether to perform sounding reference signal (SRS) measurement. The network device sends the downlink control information in the common search space or the common control resource set; or the network device sends the downlink control information, and the downlink control information is in the first format. Correspondingly, the terminal device receives the downlink control information in the common search space or the common control resource set, and/or the downlink control information received by the terminal device is in the first format. The at least one information field does not carry information indicated by the sixth information field.

With reference to the foregoing embodiment, the network device sends the downlink control information in the specific search space or the specific control resource set, and/or the downlink control information sent by the network device is in the second format. Correspondingly, the terminal device receives the downlink control information in the specific search space or the specific control resource set, and/or the downlink control information received by the terminal device is in the second format. The at least one information field includes a sixth information field, and the sixth information field is greater than or equal to one bit. For example, if the sixth information field is one bit, a state "0" of the one bit indicates that the terminal device needs to report the aperiodic channel quality information, and/or a state "1" of the one bit indicates that the terminal device does not need to report the aperiodic channel quality information. Alternatively, the sixth information field is equal to four bits. For example, uplink sounding reference signal (SRS) measurement is triggered by using a state of the four bits.

It should be noted that, the at least one information field included in the downlink control information determined by the network device includes one or more information fields having a same reference name. This is not limited in this embodiment of the application. For example, the at least one information field may include one sixth information field, or may include a plurality of sixth information fields. For example, when two sixth information fields are included, one of the two sixth information fields is used to indicate whether the terminal device needs to report the aperiodic channel quality information (CQI), and the other one of the two sixth information fields is used to instruct the terminal device whether to perform sounding reference signal (SRS) measurement.

In an embodiment of this application, the at least one information field is used to indicate a redundancy version used for the data transmission scheduled by using the downlink control information. The network device sends the downlink control information in the common search space or the common control resource set; or the network device sends the downlink control information, and the downlink control information is in the first format. Correspondingly, the terminal device receives the downlink control information in the common search space or the common control resource set, and/or the downlink control information received by the terminal device is in the first format. A seventh information field is greater than or equal to one bit, a state value of the seventh information field corresponds to one of X redundancy versions, and X is a positive integer.

With reference to the foregoing embodiment, the network device sends the downlink control information in the specific search space or the specific control resource set, and/or the downlink control information sent by the network device is in the second format. Correspondingly, the terminal device receives the downlink control information in the specific search space or the specific control resource set, and/or the downlink control information received by the terminal device is in the second format. The at least one information field does not carry information indicated by a seventh information field, a preset redundancy version is used for the data transmission scheduled by using the downlink control information, and the preset redundancy version is, for example, configured by using signaling or stipulated in a protocol; or the seventh information field is greater than or equal to one bit, a state value of the seventh information field corresponds to one of L redundancy versions, and L is a positive integer.

In an embodiment of this application, the at least one information field includes an eighth information field, and the eighth information field is used to instruct the terminal device whether to report channel state measurement. The network device sends the downlink control information in the common search space or the common control resource set; or the network device sends the downlink control information, and the downlink control information is in the first format. Correspondingly, the terminal device receives the downlink control information in the common search space or the common control resource set, and/or the downlink control information received by the terminal device is in the first format. The at least one information field does not carry information indicated by an eighth information field; or the eighth information field includes one bit, the one bit is used to instruct the terminal device whether to report channel state measurement, and a manner of the channel state measurement includes one of performing measurement based on a reference signal of a closest synchronization data block, performing measurement based on a reference signal of a control resource set in which system information is located, and performing measurement based on a reference signal of a broadcast channel.

With reference to the foregoing embodiment, the network device sends the downlink control information in the specific search space or the specific control resource set, and/or the downlink control information sent by the network device is in the second format. Correspondingly, the terminal device receives the downlink control information in the specific search space or the specific control resource set, and/or the downlink control information received by the terminal device is in the second format. The at least one information field further includes a ninth information field, the eighth information field is greater than or equal to one bit, and the eighth information field that is greater than or equal to one bit is used to instruct the terminal device whether to report channel state measurement; and the ninth information field is greater than or equal to one bit, the ninth information field indicates one of V reference signals used to perform channel state measurement, and the V reference signals used to perform channel state measurement may be configured by using higher layer signaling.

In an embodiment of this application, the at least one information field includes a tenth information field, and the tenth information field indicates an uplink control channel resource configured for the data transmission scheduled by using the downlink control information. The network device sends the downlink control information in the common search space or the common control resource set; or the network device sends the downlink control information, and the downlink control information is in the first format. Correspondingly, the terminal device receives the downlink control information in the common search space or the common control resource set, and/or the downlink control information received by the terminal device is in the first format. The tenth information field includes $\lceil \log_2 B \rceil$ bits, at least one state value of the $\lceil \log_2 B \rceil$ bits corresponds to at least one of the B uplink control channel resources, the at least one of the B uplink control channel resources corresponds to an index of at least one row in a fifth table, the at least one row in the fifth table corresponds to the at least one uplink control channel resource, and B is a positive integer. The fifth table may be configured by using system information. In an implementation, a plurality of fifth tables may be configured by using system information, the terminal device determines an actually used fifth table by using a quantity of bits of uplink control information that needs to be sent, and the tenth information field in the downlink control information is used to indicate an index in the fifth table. In another possible implementation, some components in the table are configured by using system information, for example, a time domain length of the uplink control channel resource in the table may be configured, and remaining components may be predefined in a protocol.

With reference to the foregoing embodiment, the network device sends the downlink control information in the specific search space or the specific control resource set, and/or the downlink control information sent by the network device is in the second format. Correspondingly, the terminal device receives the downlink control information in the specific search space or the specific control resource set, and/or the downlink control information received by the terminal device is in the second format. The tenth information field includes $\lceil \log_2 A \rceil$ bits, at least one state value of the $\lceil \log_2 A \rceil$ bits corresponds to at least one of A uplink control channel resources, the at least one of A uplink control channel resources corresponds to an index of at least one row in a sixth table, and the at least one row corresponds to the at least one uplink control channel resource. The sixth table may be configured by using user-specific higher layer signaling.

In an embodiment of this application, the at least one information field includes an eleventh information field, and the eleventh information field indicates an assumption of a quasi-co-located relationship between a demodulation reference signal port used for the data transmission scheduled by using the downlink control information and a downlink reference signal port. The network device sends the downlink control information in the common search space or the common control resource set; or the network device sends the downlink control information, and the downlink control information is in the first format. Correspondingly, the terminal device receives the downlink control information in the common search space or the common control resource set, and/or the downlink control information received by the terminal device is in the first format. The at least one information field does not carry information indicated by the eleventh information field. Optionally, the terminal device determines, based on a quasi-co-located relationship of the search space in which the downlink control information is located or the control resource set in which the downlink control information is located, the assumption of the quasi-co-located relationship for the data transmission scheduled by using the downlink control information.

With reference to the foregoing embodiment, the network device sends the downlink control information in the specific search space or the specific control resource set, and/or the downlink control information sent by the network device is in the second format. Correspondingly, the terminal device receives the downlink control information in the specific search space or the specific control resource set, and/or the downlink control information received by the terminal device is in the second format. The at least one information field does not carry information indicated by the eleventh information field. Optionally, the terminal device determines, based on a predefined quasi-co-located relationship assumption, the assumption of the quasi-co-located relationship for the data transmission scheduled by using the downlink control information; or the terminal device determines, based on the quasi-co-located relationship of the search space in which the downlink control information is located or the control resource set in which the downlink control information is located, the assumption of the quasi-co-located relationship for the data transmission scheduled by using the downlink control information.

The technical solutions provided in this application are described in the foregoing embodiments mainly from a method perspective. It may be understood that, to implement the foregoing functions, the terminal device and the network device include corresponding hardware structures and/or software modules for performing the functions. In combination with the examples of units and algorithm steps that are described in the embodiments disclosed in this specification, this application may be implemented by using hardware or a combination of hardware and computer software. Whether a function is performed by using hardware or hardware driven by computer software depends on particular applications and design constraints of the technical solutions. Different methods may be used to implement the described functions for each particular application, but it should not be considered that the implementation goes beyond the scope of this application.

Figure 4:
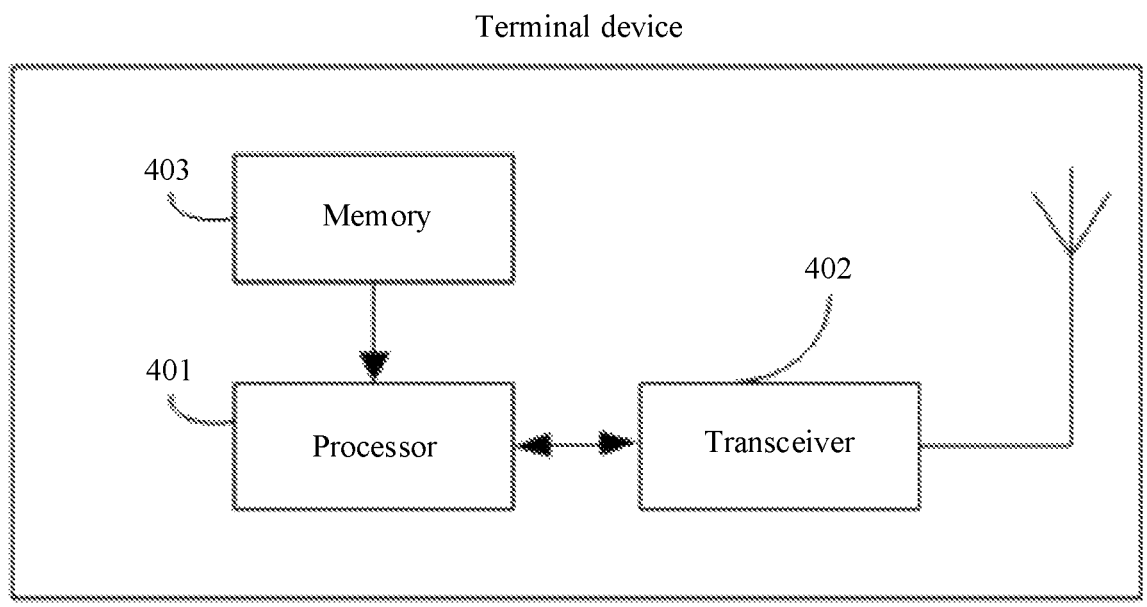
FIG. 4 is a possible schematic structural diagram of a terminal device according to this application.

FIG. 4 is a possible schematic structural diagram of the terminal device in the foregoing embodiments. In FIG. 4, a structure of the terminal device includes a processor 401 and a transceiver 402. The structure of the device may further include a memory 403, and the memory is configured to: be coupled to the processor, and store a program instruction and data that are necessary to the terminal device. The terminal device shown in FIG. 4 may perform the foregoing information sending method. To avoid repeated descriptions, detailed descriptions thereof are omitted herein.

Figure 5:
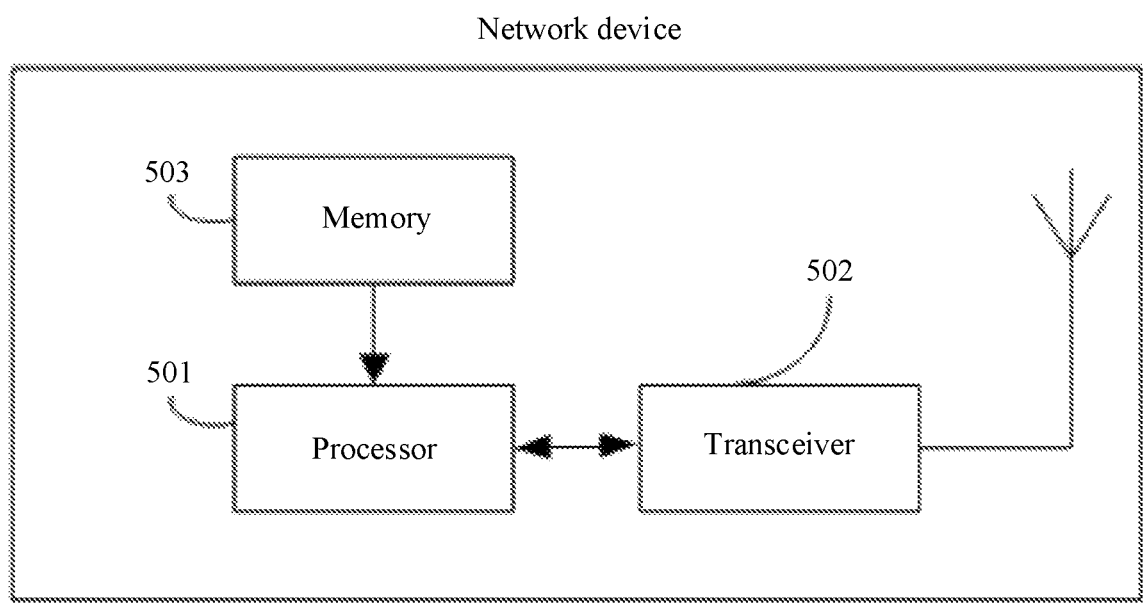
FIG. 5 is a possible schematic structural diagram of a network device according to this application.

FIG. 5 is a possible schematic structural diagram of the network device in the foregoing embodiments. In FIG. 5, a structure of the network device includes a processor 501. The structure of the device may further include a transceiver 502. The structure of the device may further include a memory 503. The memory is configured to: be coupled to the processor, and store a program instruction and data that are necessary to the network device. The network device shown in FIG. 5 may perform the foregoing information determining method. To avoid repeated descriptions, detailed descriptions thereof are omitted herein.

An embodiment of this application further provides a method for transmitting a modulation and coding scheme. The method includes the following steps.

Step S601: A terminal device receives downlink control information, where the downlink control information includes an index value of a modulation and coding scheme (MCS), the index value of the MCS is at least one of N index values in an MCS table, a modulation scheme corresponding to an index value X in the N index values is QPSK, and a value obtained by multiplying a code rate corresponding to the index value X by 1024 is less than or equal to 82.

Step S602: The terminal device determines, based on the index value of the MCS, a modulation scheme and a code rate that are used for data transmission.

Optionally, the index value X is an index value 1.

Optionally, a value obtained by multiplying the code rate corresponding to the index value X by 1024 is greater than or equal to 43; and/or an efficiency value is greater than or equal to 0.083579, and/or an efficiency value is less than or equal to 0.1592.

Optionally, the modulation scheme in the MCS table is that a value obtained by multiplying the code rate corresponding to the index value X by 1024 includes at least one of the following values:

82, 65, 54, 46, and 43.

Optionally, the modulation scheme in the MCS table is that a value obtained by multiplying the code rate corresponding to the index value X by 1024 includes at least one of the following values:

81, 64, 59, 46, and 43.

Optionally, a modulation scheme corresponding to each of an index value 12 to an index value 15 in the MCS table is 16QAM.

Optionally, the N index values in the MCS table correspond to at least two coding schemes and a non-coding scheme, specifically including:

an index value 0 does not correspond to data and a coding scheme, a coding scheme corresponding to the index value X is Polar, a coding scheme corresponding to an index value Y is LDPC, and the index value Y is greater than the index value X.

Optionally, the MCS table corresponds to at least two BLERs, and the at least two BLERs specifically include a first BLER corresponding to the index value X and a second BLER corresponding to the index value Y, where the index value Y is greater than the index value X. Further optionally, the second BLER is less than the first BLER. For example, the second BLER is 10e-5, and the first BLER is 10e-2.

Optionally, for the N index values in the MCS table, a quantity of index values corresponding to a coding scheme LDPC is greater than or equal to a quantity of index values corresponding to a coding scheme Polar.

Optionally, the MCS table corresponds to at least one BLER, and the BLER is at least one of the following: 10e-1, 10e-2, 10e-3, 10e-4, 10e-5, and 10e-6.

Optionally, the MCS table may include only the index, the modulation scheme, and the code rate, and does not include the coding scheme.

Beneficial effects of this application include: An existing LTE system supports only a 10e-1 MCS table, but a plurality of BLERs have already been introduced in 5G NR. Therefore, the table in the prior art is not applicable to a 5G system. Further, in consideration of a service feature of URLLC, an MCS at a lower code rate needs to be introduced. Therefore, in this application, MCS indication information that can be implemented under different BLERs may be provided, so that the 5G NR system supports MCS indications corresponding to a plurality of BLERs, thereby satisfying a requirement for supporting a URLLC service.

Further, items in Table 3 to Table 12 may be freely combined. To be specific, a CQI table may include only some items or some index values in Table 3 to Table 12. For example, only an item whose index value is 1 in the CQI table corresponds to an item whose index value is 1 in each of Table 3 to Table 12.

TABLE 3

10e−1 MCS Table

| Coding scheme | Index | Modulation scheme | Code rate* 1024 |
|---|---|---|---|
|  | 0 | — | — |
| Polar | 1 | 2 | 82 |
|  | 2 | 2 | 108 |
|  | 3 | 2 | 141 |
|  | 4 | 2 | 185 |
|  | 5 | 2 | 243 |
|  | 6 | 2 | 313 |
|  | 7 | 2 | 397 |
|  | 8 | 2 | 495 |
|  | 9 | 2 | 602 |
|  | 10 | 2 | 713 |
|  | 11 | 2 | 817 |
| LDPC | 12 | 4 | 488 |
|  | 13 | 4 | 574 |
|  | 14 | 4 | 662 |
|  | 15 | 4 | 750 |

TABLE 4

10e−2 MCS Table

| Coding scheme | Index | Modulation scheme | Code rate* 1024 |
|---|---|---|---|
| — | 0 | — | — |
| Polar | 1 | 2 | 65 |
|  | 2 | 2 | 90 |
|  | 3 | 2 | 120 |
|  | 4 | 2 | 160 |
|  | 5 | 2 | 213 |
|  | 6 | 2 | 279 |
|  | 7 | 2 | 360 |
|  | 8 | 2 | 455 |
| Polar or LDPC | 9 | 2 | 562 |
|  | 10 | 2 | 675 |
|  | 11 | 2 | 782 |
| LDPC | 12 | 4 | 466 |
|  | 13 | 4 | 554 |
|  | 14 | 4 | 643 |
|  | 15 | 4 | 732 |

TABLE 5

10e−3 MCS Table

| Coding scheme | Index | Modulation scheme | Code rate* 1024 |
|---|---|---|---|
|  | 0 | — | — |
| Polar | 1 | 2 | 54 |
|  | 2 | 2 | 77 |
|  | 3 | 2 | 105 |
|  | 4 | 2 | 142 |
|  | 5 | 2 | 191 |
|  | 6 | 2 | 255 |
|  | 7 | 2 | 333 |
|  | 8 | 2 | 426 |
| LDPC | 9 | 2 | 536 |
|  | 10 | 2 | 652 |
|  | 11 | 2 | 760 |
|  | 12 | 4 | 449 |
|  | 13 | 4 | 538 |

TABLE 5-continued

10e−3 MCS Table

| Coding scheme | Index | Modulation scheme | Code rate* 1024 |
|---|---|---|---|
|  | 14 | 4 | 628 |
|  | 15 | 4 | 718 |

TABLE 6

10e−4 MCS Table

| Coding scheme | Index | Modulation scheme | Code rate* 1024 |
|---|---|---|---|
| — | 0 | — | — |
| Polar | 1 | 2 | 46 |
|  | 2 | 2 | 67 |
|  | 3 | 2 | 94 |
|  | 4 | 2 | 128 |
|  | 5 | 2 | 174 |
|  | 6 | 2 | 235 |
|  | 7 | 2 | 311 |
|  | 8 | 2 | 401 |
| LDPC | 9 | 2 | 513 |
|  | 10 | 2 | 630 |
|  | 11 | 2 | 737 |
|  | 12 | 4 | 435 |
|  | 13 | 4 | 524 |
|  | 14 | 4 | 614 |
|  | 15 | 4 | 704 |

TABLE 7

10e−5 MCS Table

| Coding scheme | Index | Modulation scheme | Code rate* 1024 |
|---|---|---|---|
|  | 0 | — | — |
| Polar | 1 | 2 | 43 |
|  | 2 | 2 | 59 |
|  | 3 | 2 | 85 |
|  | 4 | 2 | 116 |
|  | 5 | 2 | 159 |
|  | 6 | 2 | 218 |
|  | 7 | 2 | 290 |
|  | 8 | 2 | 379 |
| Polar or LDPC | 9 | 2 | 485 |
|  | 10 | 2 | 602 |
|  | 11 | 2 | 707 |
| LDPC | 12 | 4 | 418 |
|  | 13 | 4 | 509 |
|  | 14 | 4 | 597 |
|  | 15 | 4 | 682 |

TABLE 8

10e−1 MCS Table

| Coding scheme | Index | Modulation scheme | Code rate* 1024 |
|---|---|---|---|
|  | 0 | — | — |
| Polar | 1 | 2 | 81 |
|  | 2 | 2 | 108 |
|  | 3 | 2 | 143 |
|  | 4 | 2 | 187 |
|  | 5 | 2 | 242 |
|  | 6 | 2 | 310 |
|  | 7 | 2 | 394 |
|  | 8 | 2 | 492 |
|  | 9 | 2 | 599 |
|  | 10 | 2 | 710 |
|  | 11 | 2 | 815 |
|  | 12 | 4 | 483 |
|  | 13 | 4 | 570 |

TABLE 8-continued 10e-1 MCS Table

| Coding scheme | Index | Modulation scheme | Code rate* 1024 |
|---|---|---|---|
|  | 14 | 4 | 658 |
|  | 15 | 4 | 744 |

TABLE 9

10e-2 MCS Table

| Coding scheme | Index | Modulation scheme | Code rate* 1024 |
|---|---|---|---|
|  | 0 | — | — |
| Polar | 1 | 2 | 71 |
|  | 2 | 2 | 95 |
|  | 3 | 2 | 126 |
|  | 4 | 2 | 165 |
|  | 5 | 2 | 215 |
|  | 6 | 2 | 277 |
|  | 7 | 2 | 354 |
|  | 8 | 2 | 446 |
|  | 9 | 2 | 550 |
|  | 10 | 2 | 658 |
|  | 11 | 2 | 764 |
|  | 12 | 4 | 442 |
|  | 13 | 4 | 525 |
|  | 14 | 4 | 610 |
|  | 15 | 4 | 696 |

TABLE 10

10e-3 MCS Table

| Coding scheme | Index | Modulation scheme | Code rate* 1024 |
|---|---|---|---|
|  | 0 | — | — |
| Polar | 1 | 2 | 64 |
|  | 2 | 2 | 86 |
|  | 3 | 2 | 115 |
|  | 4 | 2 | 152 |
|  | 5 | 2 | 197 |
|  | 6 | 2 | 255 |
|  | 7 | 2 | 327 |
|  | 8 | 2 | 414 |
|  | 9 | 2 | 514 |
|  | 10 | 2 | 621 |
|  | 11 | 2 | 726 |
|  | 12 | 2 | 828 |
|  | 13 | 4 | 492 |
|  | 14 | 4 | 576 |
|  | 15 | 4 | 661 |

TABLE 11

10e-4 MCS Table

| Coding scheme | Index | Modulation scheme | Code rate* 1024 |
|---|---|---|---|
|  | 0 | — | — |
| Polar | 1 | 2 | 59 |
|  | 2 | 2 | 80 |
|  | 3 | 2 | 107 |
|  | 4 | 2 | 142 |
|  | 5 | 2 | 184 |
|  | 6 | 2 | 237 |
|  | 7 | 2 | 304 |
|  | 8 | 2 | 388 |
|  | 9 | 2 | 486 |
|  | 10 | 2 | 590 |
|  | 11 | 2 | 695 |
|  | 12 | 2 | 797 |
|  | 13 | 4 | 464 |

TABLE 11-continued 10e-4 MCS Table

| Coding scheme | Index | Modulation scheme | Code rate* 1024 |
|---|---|---|---|
|  | 14 | 4 | 548 |
|  | 15 | 4 | 633 |

TABLE 12

10e-5 MCS Table

| Coding scheme | Index | Modulation scheme | Code rate* 1024 |
|---|---|---|---|
|  | 0 | — | — |
| Polar | 1 | 2 | 55 |
|  | 2 | 2 | 74 |
|  | 3 | 2 | 100 |
|  | 4 | 2 | 133 |
|  | 5 | 2 | 173 |
|  | 6 | 2 | 223 |
|  | 7 | 2 | 286 |
|  | 8 | 2 | 365 |
|  | 9 | 2 | 460 |
|  | 10 | 2 | 564 |
|  | 11 | 2 | 669 |
|  | 12 | 2 | 770 |
|  | 13 | 4 | 441 |
|  | 14 | 4 | 523 |
|  | 15 | 4 | 608 |

Further, items in Table 3 to Table 12 may be mutually combined. To be specific, one MCS table may include some elements in any two of Table 3 to Table 12. For example, one CQI table includes values corresponding to 10e-1 and values corresponding to 10e-5. A column of indications is added to the new table, to indicate a block error rate BLER corresponding to an MCS. For example, Table 13 and/or Table 14 may be formed in the foregoing manner. It should be noted that the elements in the tables in the present application are examples, and not all elements need to exist. For example, only one row or some rows are included.

TABLE 13

MCS Table

| Coding scheme | Index | Modulation scheme | Code rate* 1024 | Block error rate (BLER) |
|---|---|---|---|---|
|  | 0 | — | — |  |
| Polar | 1 | 2 | 82 | 10e-1 (First BLER) |
|  | 2 | 2 | 108 |  |
|  | 3 | 2 | 141 |  |
| LDPC | 4 | 4 | 488 |  |
|  | 5 | 4 | 574 |  |
|  | 6 | 4 | 662 |  |
|  | 7 | 6 | 772 |  |
|  | 8 | 6 | 873 |  |
| Polar | 9 | 2 | 602 | 10e-5 (Second BLER) |
|  | 10 | 2 | 713 |  |
|  | 11 | 2 | 817 |  |
|  | 12 | 2 | 488 |  |
| LDPC | 13 | 4 | 574 |  |
|  | 14 | 4 | 662 |  |
|  | 15 | 4 | 750 |  |

TABLE 14

MCS Table

| Coding scheme | Index | Modulation scheme | Code rate* 1024 | BLER |
|---|---|---|---|---|
| | 0 | — | — | |
| Polar | 1 | 2 | 65 | 10E−2 |
| | 2 | 2 | 160 | |
| | 3 | 2 | 360 | |
| | 4 | 2 | 782 | |
| LDPC | 5 | 4 | 466 | |
| | 6 | 4 | 554 | |
| | 7 | 4 | 643 | |
| | 8 | 4 | 732 | |
| Polar | 9 | 2 | 43 | 10E−5 |
| | 10 | 2 | 116 | |
| | 11 | 2 | 290 | |
| | 12 | 2 | 707 | |
| LDPC | 13 | 4 | 418 | |
| | 14 | 4 | 509 | |
| | 15 | 4 | 597 | |

The components of the terminal device and the network device shown in FIG. 4 and FIG. 5 are configured to perform the foregoing method. Therefore, for beneficial effects of the network device and the terminal device, reference may be made to beneficial effects of the foregoing method, and details are not described herein again.

An embodiment of this application further provides a computer-readable storage medium, including an instruction, and when the instruction runs on a computer, the computer performs the method for determining downlink control information that is performed by the foregoing network device or the foregoing terminal device.

An embodiment of this application further provides a communication system. The communication system includes the terminal device shown in FIG. 4 and the network device shown in FIG. 5. The terminal device and the network device communicate to perform the foregoing method for information sending and the foregoing method for determining information.

It should be noted that, the foregoing method embodiments in the embodiments of this application may be applied to a processor, or implemented by the processor. The processor may be an integrated circuit chip having a signal processing capability. In an implementation process, steps in the foregoing method embodiments can be implemented by using a hardware integrated logical circuit in the processor, or by using instructions in a form of software. The processor may be one or more of a general-purpose processor, a digital signal processor (DSP), an application-specific integrated circuit (ASIC), a field programmable gate array (FPGA) or another programmable logical device, a discrete gate or transistor logic device, and a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in a memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the system and method described in this specification intends to include but is not limited to these memories and any other appropriate types of memories.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be understood that "an embodiment", "one embodiment", or "this embodiment of the application" mentioned in the specification means that particular features, structures, or characteristics related to the embodiment are included in at least one embodiment of this application. Therefore, "in an embodiment", "in one embodiment", or "in this embodiment of the application" appearing throughout the specification may not refer to a same embodiment. In addition, these particular features, structures, or characteristics may be combined in one or more embodiments in any appropriate manner.

In combination with the examples of units and algorithm steps that are described in the embodiments disclosed in this specification, this application may be implemented by using electronic hardware or a combination of computer software and electronic hardware. Whether the functions are performed by hardware or software depends on particular applications and design constraints of the technical solutions. Different methods may be used to implement the described functions for each particular application, but it should not be considered that the implementation goes beyond the scope of the embodiments of this application.

For the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application.

What is claimed is:

1. A method for communicating with a network device, the method comprising:
   receiving, by a terminal device, first downlink control information (DCI) from the network device in a terminal device-specific (UE-specific) search space or in a common search space; and
   performing, by the terminal device, data transmission with the network device according to the first DCI;
   wherein the first DCI comprises a first information field indicating a location of a time domain resource scheduled for the data transmission, wherein the location is based on a start symbol and a quantity of symbols,
   wherein when the first DCI is received in the common search space, the start symbol and the quantity of symbols are based on the first information field and a first correspondence between (i) a value of in the first information field and (ii) the start symbol and the quantity of symbols; and
   wherein when the first DCI is received in the UE-specific search space, the start symbol and the quantity of symbols are based on the first information field and a second correspondence between (i) a value of the first information field and (ii) the start symbol and the quantity of symbols.

2. The method according to claim 1,
   wherein when the first DCI is received in the common search space, the first information field comprises $\lceil \log_2 N \rceil$ bits, the first correspondence is comprised in a first set, a state value of the $\lceil \log_2 N \rceil$ bits corresponds to an element in the first set, at least one element in the first set indicates the start symbol and the quantity of symbols, wherein N is a positive integer.

3. The method according to claim 1,
   wherein when the first DCI is received in the UE-specific search space, the first information field comprises $\lceil \log_2 M \rceil$ bits, the second correspondence is comprised in a second set, a state value of the $\lceil \log_2 M \rceil$ bits corresponds to an element in the second set, at least one element in the second set indicates the start symbol and the quantity of symbols, wherein M is a positive integer.

4. The method according to claim 1, wherein the first DCI further comprises a format of the first DCI, the format of the first DCI is one of a plurality of formats, and a quantity of bits of the first DCI in different formats of the plurality of formats is the same.

5. A method for sending downlink control information to a terminal device, comprising:
   determining, by a network device, first downlink control information (DCI), wherein the first DCI comprises a first information field; and
   sending, by the network device, the first DCI to the terminal device in a terminal device-specific (UE-specific) search space or in a common search space;
   wherein the first information field indicates a location of a time domain resource scheduled for the terminal device to perform data transmission, wherein the location is based on a start symbol and a quantity of symbols,
   wherein when the first DCI is sent in the common search space, the start symbol and the quantity of symbols are based on the first information field and a first correspondence between (i) a value of the first information field and (ii) the start symbol and the quantity of symbols; and
   wherein when the first DCI is sent in the UE-specific search space, the start symbol and the quantity of symbols are based on the first information field and a second correspondence between (i) a value of the first information field and (ii) the start symbol and the quantity of symbols.

6. The method according to claim 5, further comprising:
   wherein when the first DCI is sent in the common search space, the first information field comprises $\lceil \log_2 N \rceil$ bits, the first correspondence is comprised in a first set, a state value of the $\lceil \log_2 N \rceil$ bits corresponds to an element in the first set, at least one element in the first set indicates the start symbol and the quantity of symbols, wherein N is a positive integer.

7. The method according to claim 5, wherein when the first DCI is sent in the UE-specific search space, the first information field comprises $\lceil\log_2 M\rceil$ bits, the second correspondence is comprised in a second set, a state value of the $\lceil\log_2 M\rceil$ bits corresponds to an element in the second set, at least one element in the second set indicates the start symbol and the quantity of symbols, and M is a positive integer.

8. The method according to claim 5, wherein the first DCI further comprises a format of the first DCI, the format of the first DCI is one of a plurality of formats, and a quantity of bits of the first DCI in different formats of the plurality of formats is the same.

9. A communication apparatus, comprising:
a processor; and
a memory storing instructions for execution by the processor, wherein when the processor executes the instructions, the communication apparatus is enabled to perform the following steps:
receiving first downlink control information (DCI) from a network device in a terminal device-specific (UE-specific) search space or in a common search space; and
performing data transmission with the network device according to the first DCI;
wherein the first DCI comprises a first information field indicating a location of time domain resource schedule for the data transmission, wherein the location is based on a start symbol and a quantity of symbols,
wherein when the first DCI is received in the common search space, the start symbol and the quantity of symbols are based on the first information field and a first correspondence between (i) a value of the first information field and (ii) the start symbol and the quantity of symbols; and
wherein when the first DCI is received in the UE-specific search space, the start symbol and the quantity of symbols are based on the first information field and a second correspondence between (i) a value of the first information field and (ii) the start symbol and the quantity of symbols.

10. The communication apparatus according to claim 9, wherein when the first DCI is received in the common search space, the first information field comprises $\lceil\log_2 N\rceil$ bits, the first correspondence is comprised in a first set, a state value of the $\lceil\log_2 N\rceil$ bits corresponds to an element in the first set, at least one element in the first set indicates the start symbol and the quantity of symbols, wherein N is a positive integer.

11. The communication apparatus according to claim 10, wherein the first set is stipulated in a protocol.

12. The communication apparatus according to claim 9, wherein when the first DCI is received in the UE-specific search space, the first information field comprises $\lceil\log_2 M\rceil$ bits, the second correspondence is comprised in a second set, a state value of the $\lceil\log_2 M\rceil$ bits corresponds to an element in the second set, at least one element in the second set indicates the start symbol and the quantity of symbols, wherein M is a positive integer.

13. The communication apparatus according to claim 11, wherein the second set is configured by higher layer signaling.

14. The communication apparatus according to claim 9, wherein the first DCI further comprises a format of the first DCI, the format of the first DCI is one of a plurality of formats, and a quantity of bits of the first DCI in different formats of the plurality of formats is the same.

15. The communication apparatus according to claim 9, wherein the first DCI further comprises a second information field;

wherein when the first DCI is received in the common search space, the second information field comprises $\lceil\log_2 P\rceil$ bits, one of at least one state value of the $\lceil\log_2 P\rceil$ bits corresponds to one of P K values, each of the P K values indicates a time interval between a receiving time of data transmission scheduled by the first DCI and a transmitting time of a hybrid automatic repeat request (HARQ) feedback corresponding to the data transmission, and P is a positive integer, wherein the P K values are stipulated in a protocol; and
wherein when the first DCI is received in the UE-specific search space, the communication apparatus is further configured to perform: receiving configuration information, wherein the configuration information indicates a set of K values, the set of K values comprises Q K values, the second information field comprises $\lceil\log_2 Q\rceil$ bits, one of at least one state value of the $\lceil\log_2 Q\rceil$ bits corresponds to one of the Q K values, each of the Q K values indicates a time interval between a receiving time of data transmission scheduled by the first DCI and a transmitting time of a HARQ feedback corresponding to the data transmission, and Q is a positive integer.

16. The communication apparatus according to claim 9, wherein the first DCI further comprises a third information field, and the third information field indicates a frequency domain resource location occupied by the data transmission scheduled by the first DCI, the frequency domain resource location is in a bandwidth part (BWP) and the BWP is activated after a radio resource control (RRC) connection is established, and the BWP comprises an uplink BWP and/or a downlink BWP.

17. The communication apparatus according to claim 9, wherein the first correspondence is stipulated in a protocol, and the second correspondence is configured by higher layer signaling.

18. The communication apparatus according to claim 9, wherein the first correspondence and the second correspondence are configured by higher layer signaling respectively.

19. A communication apparatus, comprising:
a processor; and
a memory storing instructions for execution by the processor, wherein when the processor executes the instructions, the communication apparatus is enabled to perform the following steps:
determining first downlink control information (DCI), wherein the first DCI comprises a first information field; and
sending the first DCI to a terminal device in a terminal device-specific (UE-specific) search space or in a common search space;
wherein the first information field indicates a location of a time domain resource scheduled for the terminal device to perform data transmission, wherein the location is based on a start symbol and a quantity of symbols,
wherein when the first DCI is sent in the common search space, the start symbol and the quantity of symbols are based on the first information field and a first correspondence between (i) a value of the first information field and (ii) the start symbol and the quantity of symbols; and
wherein when the first DCI is sent in the UE-specific search space, the start symbol and the quantity of symbols are based on the first information field and a second correspondence between (i) a value of the first information field and (ii) the start symbol and the quantity of symbols.

20. The communication apparatus according to claim 19, wherein when the first DCI is sent in the common search space, the first information field comprises $\lceil \log_2 N \rceil$ bits, the first correspondence is comprised in a first set, a state value of the $\lceil \log_2 N \rceil$ bits corresponds to an element in the first set, at least one element in the first set indicates the start symbol and the quantity of symbols, wherein N is a positive integer.

21. The communication apparatus according to claim 20, wherein the first set is stipulated in a protocol.

22. The communication apparatus according to claim 19, wherein when the first DCI is sent in the UE-specific search space, the first information field comprises $\lceil \log_2 M \rceil$ bits, the second correspondence is comprised in a second set, a state value of the $\lceil \log_2 M \rceil$ bits corresponds to an element in a second set, at least one element in the second set indicates the start symbol and the quantity of symbols, and M is a positive integer.

23. The communication apparatus according to claim 22, wherein when the instructions are executed by the processor, the communication apparatus is further enabled to perform:
sending the second set to the terminal device via higher layer signaling.

24. The communication apparatus according to claim 19, wherein the first DCI further comprises a format of the first DCI, wherein the format of the first DCI is one of a plurality of formats, and a quantity of bits of the first DCI in different formats of the plurality of formats is the same.

25. The communication apparatus according to claim 19, wherein the first DCI further comprises a second information field;
wherein when the first DCI is sent in the common search space, the second information field comprises $\lceil \log_2 P \rceil$ bits, one of at least one state value of the $\lceil \log_2 P \rceil$ bits corresponds to one of P K values, each of the P K values indicates a time interval between a receiving time of data transmission scheduled by the first DCI and a transmitting time of a hybrid automatic repeat request (HARQ) feedback corresponding to the data transmission, and P is a positive integer, wherein the P K values are stipulated in a protocol; and
wherein when the first DCI is sent in the UE-specific search space, the communication apparatus is further configured to perform: sending configuration information to the terminal, wherein the configuration information indicates a set of K values, the set of K values comprises Q K values, the second information field comprises $\lceil \log_2 Q \rceil$ bits, one of at least one state value of the $\lceil \log_2 Q \rceil$ bits corresponds to one of the Q K values, each of the Q K values indicates a time interval between a receiving time of data transmission scheduled by the first DCI and a transmitting time of a HARQ feedback corresponding to the data, and Q is a positive integer.

26. The communication apparatus according to claim 19, wherein the first DCI further comprises a third information field, and the third information field indicates a frequency domain resource location occupied by the data transmission scheduled by the first DCI, the frequency domain resource location is in a bandwidth part (BWP) and the BWP is activated after a radio resource control (RRC) connection is established, and the BWP comprises an uplink BWP and/or a downlink BWP.

27. The communication apparatus according to claim 19, wherein the first correspondence is stipulated in a protocol, and when the instructions are executed by the processor, the communication apparatus is further enabled to perform:
sending the second correspondence to the terminal device via higher layer signaling.

28. The communication apparatus according to claim 19, wherein when the instructions are executed by the processor, the communication apparatus is further enabled to perform:
sending the first correspondence and the second correspondence to the terminal device via higher layer signaling respectively.

* * * * *